US010642486B2

(12) United States Patent
Iida

(10) Patent No.: US 10,642,486 B2
(45) Date of Patent: May 5, 2020

(54) INPUT DEVICE, INPUT CONTROL METHOD, AND INPUT CONTROL PROGRAM

(71) Applicant: SONY COMPUTER ENTERTAINMENT INC., Tokyo (JP)

(72) Inventor: Yusuke Iida, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 806 days.

(21) Appl. No.: 14/394,635

(22) PCT Filed: Apr. 11, 2013

(86) PCT No.: PCT/JP2013/002487
§ 371 (c)(1),
(2) Date: Oct. 15, 2014

(87) PCT Pub. No.: WO2013/168358
PCT Pub. Date: Nov. 14, 2013

(65) Prior Publication Data
US 2015/0095828 A1     Apr. 2, 2015

(30) Foreign Application Priority Data

May 7, 2012   (JP) ................................. 2012-106214

(51) Int. Cl.
  *G06F 3/0488*   (2013.01)
  *G06F 3/0484*   (2013.01)
  *G06T 3/40*     (2006.01)

(52) U.S. Cl.
  CPC ...... *G06F 3/04886* (2013.01); *G06F 3/04842* (2013.01); *G06F 3/04847* (2013.01); *G06F 3/04883* (2013.01); *G06T 3/40* (2013.01)

(58) Field of Classification Search
  CPC .................................................. G06F 3/04886
  (Continued)

(56) References Cited

U.S. PATENT DOCUMENTS 5,543,588 A *  8/1996  Bisset .................. G06F 1/1626
                                              178/18.06
5,729,219 A *  3/1998  Armstrong .......... G06F 3/03547
                                              340/7.55

(Continued)

FOREIGN PATENT DOCUMENTS

JP    2009-187058 A    8/2009
JP    2010-67135 A     3/2010

(Continued)

OTHER PUBLICATIONS

Merriam-Webster, "Definition of Disable", [online] https://www.merriam-webster.com/dictionary/disable (Year: 2018).*

(Continued)

*Primary Examiner* — Renee D Chavez
*Assistant Examiner* — Sean Hsiao
(74) *Attorney, Agent, or Firm* — Katten Muchin Rosenman LLP

(57) ABSTRACT

A game device 10 includes: a keyboard display section 112 displaying a plurality of input regions corresponding to a plurality of input objects on a screen of a display device, receiving a first operation input on a rear touch pad, and displaying, in an enlarged state, a predetermined input region among the plurality of input regions; and an input receiving section 111 receiving a second operation input for determining an input object, and inputting the input object corresponding to an input region identified by the second operation input.

10 Claims, 17 Drawing Sheets

(58) Field of Classification Search
USPC .......................................................... 345/173
See application file for complete search history.

(56) References Cited

U.S. PATENT DOCUMENTS

| | | | | |
|---|---|---|---|---|
| 8,352,884 B2* | 1/2013 | Zalewski | ............... | G06F 1/1626 715/811 |
| 2003/0007017 A1* | 1/2003 | Laffey | ................. | G06F 3/04812 715/862 |
| 2003/0234768 A1* | 12/2003 | Rekimoto | ............. | G06F 1/1626 345/169 |
| 2005/0114825 A1* | 5/2005 | Leung | ................... | G06F 1/1616 717/100 |
| 2007/0097151 A1* | 5/2007 | Rosenberg | ............ | G06F 1/1626 345/660 |
| 2007/0268261 A1* | 11/2007 | Lipson | ................... | G06F 1/1616 345/169 |
| 2009/0198987 A1 | 8/2009 | Sumioka et al. | | |
| 2010/0066695 A1 | 3/2010 | Miyazaki | | |
| 2010/0156807 A1* | 6/2010 | Stallings | ............. | G06F 3/04886 345/173 |
| 2010/0188353 A1* | 7/2010 | Yoon | ................... | G06F 3/04883 345/173 |
| 2010/0295817 A1 | 11/2010 | Nicholson et al. | | |
| 2011/0012921 A1* | 1/2011 | Cholewin | .............. | G06F 1/1626 345/619 |
| 2011/0080359 A1* | 4/2011 | Jang | ...................... | G06F 1/1643 345/173 |
| 2011/0124376 A1* | 5/2011 | Kim | ....................... | G06F 1/1626 455/566 |
| 2011/0167375 A1* | 7/2011 | Kocienda | ............. | G06F 1/3203 715/773 |
| 2011/0254865 A1* | 10/2011 | Yee | ......................... | G06F 3/013 345/661 |
| 2011/0285631 A1* | 11/2011 | Imamura | ............... | G06F 1/1616 345/168 |
| 2012/0050335 A1* | 3/2012 | Hou | ....................... | G06F 3/0481 345/661 |
| 2012/0105331 A1* | 5/2012 | Nomoto | .................. | G06F 3/041 345/169 |
| 2012/0113023 A1* | 5/2012 | Koch | .................. | G06F 3/04886 345/173 |
| 2012/0169613 A1* | 7/2012 | Armstrong | .......... | G06F 3/04886 345/173 |
| 2012/0174044 A1* | 7/2012 | Koga | .................. | G06F 3/04883 715/863 |
| 2013/0093687 A1* | 4/2013 | Papakipos | ............... | G06F 1/169 345/173 |
| 2013/0093690 A1* | 4/2013 | Papakipos | ............. | G06F 3/0488 345/173 |
| 2013/0100034 A1* | 4/2013 | Papakipos | ............. | G06F 1/1626 345/173 |
| 2013/0100035 A1* | 4/2013 | Papakipos | ............... | G06F 1/169 345/173 |
| 2013/0100036 A1* | 4/2013 | Papakipos | ............. | G06F 1/1643 345/173 |
| 2013/0222329 A1* | 8/2013 | Larsby | ................ | G06F 3/04886 345/174 |
| 2013/0286573 A1* | 10/2013 | Adams | .................. | G06F 1/1694 361/679.2 |

FOREIGN PATENT DOCUMENTS

| | | |
|---|---|---|
| JP | 2011-165023 A | 8/2011 |
| WO | 2010/135127 A2 | 11/2010 |

OTHER PUBLICATIONS

Translation of International Preliminary Report on Patentability dated Dec. 4, 2014 from corresponding Application No. PCT/JP2013/002487.

International Search Report dated Jul. 16, 2013, from the corresponding PCT/JP2013/002487.

* cited by examiner (a)

(b)

(a)

(b)

(c)

INPUT DEVICE, INPUT CONTROL METHOD, AND INPUT CONTROL PROGRAM

TECHNICAL FIELD

The present invention relates to an input control technology, and particularly to an input device, an input control method, and an input control program that control input in a portable terminal.

BACKGROUND ART

User interfaces using a touch pad are widely employed in portable type game machines, smart phones, and the like.

SUMMARY

Technical Problem

Recently, portable type game machines and portable telephone terminals have spread explosively, and opportunities to experience user interfaces using a touch pad in daily life have increased dramatically. In such a situation, there is an eager desire for a more convenient user interface.

The present invention has been made in view of such a situation. It is an object of the present invention to provide a more convenient input control technology.

Solution to Problem

A mode of the present invention relates to an input control program. The input control program makes a computer realize: a function of displaying a plurality of input regions corresponding to a plurality of input objects on a screen of a display device; a function of receiving a first operation input, and displaying, in an enlarged state, a predetermined input region among the plurality of input regions; and a function of receiving a second operation input, and inputting an input object corresponding to an input region identified by the second operation input.

Another mode of the present invention also relates to an input control program. The input control program makes a computer realize: a first function of receiving a drawing input of a figure requested to input a character string, referring to a database storing a character string and information on a figure requested to be drawn to input the character string in association with each other, and searching for a figure coinciding with the received figure; and a second function of, when the figure coinciding with the received figure is retrieved, reading the character string associated with the figure from the database, and inputting the character string.

It is to be noted that arbitrary combinations of the above constituent elements as well as modes realized by converting expressions of the present invention between a method, a device, a system, and the like are also effective as modes of the present invention.

Advantageous Effect of Invention

According to the present invention, a more convenient input control technology can be provided.

BRIEF DESCRIPTION OF DRAWINGS

FIG. 1(*b*) is a diagram showing the rear of the game device.

FIG. 2(*b*) is a diagram showing the bottom surface of the game device, and

FIG. 2(*c*) is a diagram showing the left side surface of the game device.

DESCRIPTION OF EMBODIMENTS

An external constitution and a circuit configuration of a game device 10 according to a present embodiment will first be described. The game device 10 shown in the following is a portable type game machine, but may be another kind of portable type terminal device.

Structure of the Front Face

Figure 1:
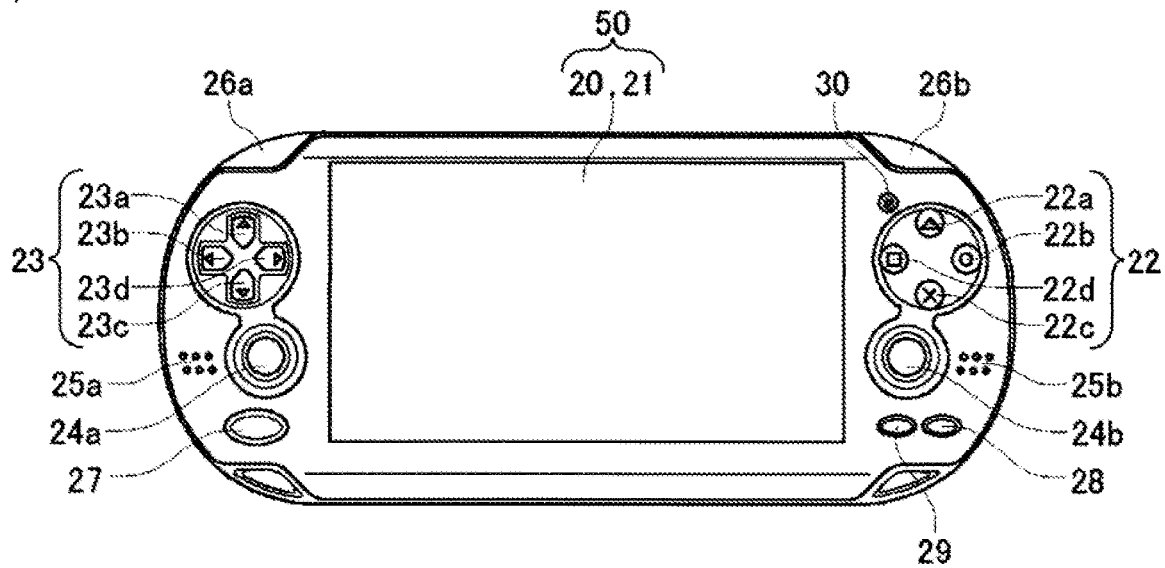
FIG. 1(*a*) is a diagram showing the front of a game device.
Figure 1:
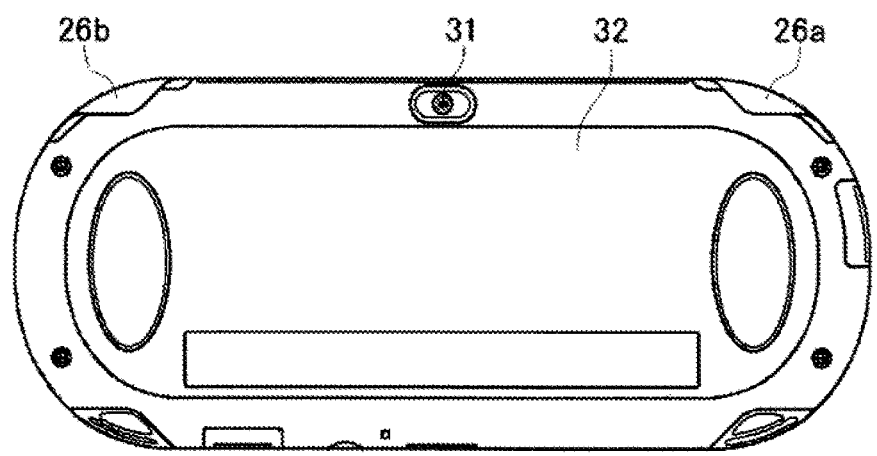

FIG. 1(*a*) shows the front of the game device 10. The game device 10 is formed into a horizontally long housing. The right and left sides of the housing, which are held by a user, have an arc-shaped outer surface. On the front surface of the game device 10 is provided a rectangular touch panel 50. The touch panel 50 includes a display device 20 and a front touch pad 21 that is transparent and covers the surface of the display device 20. The display device 20 is an organic Electro-Luminescence (EL) panel, and displays an image. Alternatively, the display device 20 may be display means such as a liquid crystal panel or the like. The front touch pad 21 is a multi-touch pad having a function of detecting a plurality of points touched concurrently. The touch panel 50 is configured as a multi-touch screen.

At the right of the touch panel 50 are provided a triangle button 22*a*, a circle button 22*b*, a cross button 22*c*, and a square button 22*d* (hereinafter referred to as "control buttons 22" when referred collectively). The buttons are located at the vertices of a rhombus, respectively. At the left of the touch panel 50 are provided an up key 23*a*, a left key 23*b*, a down key 23*c*, and a right key 23*d* (hereinafter referred to as "directional keys 23" when referred collectively). A user can input eight directions (up, down, left, and right directions, and diagonal directions) by manipulating the directional keys 23. Below the directional keys 23, a left stick 24*a* is provided, and below the control buttons 22, a right stick 24*b* is provided. A user tilts the left stick 24*a* or the right stick 24*b* (hereinafter referred to as "analogue sticks 24" when referred collectively) so as to input the direction and the degree of the tilt. On the upper left and upper right of the housing an L button 26*a* and an R button 26*b* are provided, respectively. The control buttons 22, the directional keys 23, the analogue sticks 24, the L button 26*a*, and the R button 26*b* implement manipulation means for user manipulation.

In the vicinity of the control buttons 22, a front camera 30 is provided. At the left of the left stick 24*a* and at the right of the right stick 24*b*, a left speaker 25*a* and a right speaker 25*b* (hereinafter referred to as "speakers 25" when referred collectively) that output sound are provided respectively. Further, below the left stick 24*a* is provided a HOME button 27 and below the right stick 24*b* are provided a START button 28 and a SELECT button 29.

Structure of the Rear Face

FIG. 1(*b*) shows the rear of the game device 10. On the rear surface of the game device 10, a rear camera 31 and a rear touch pad 32 are provided. In a similar manner as that of the front touch pad 21, the rear touch pad 32 is configured as a multi-touch pad. Two cameras and two touch pads are mounted on the game device 10 at the front and rear surfaces.

Structure of the Top Surface

Figure 2:
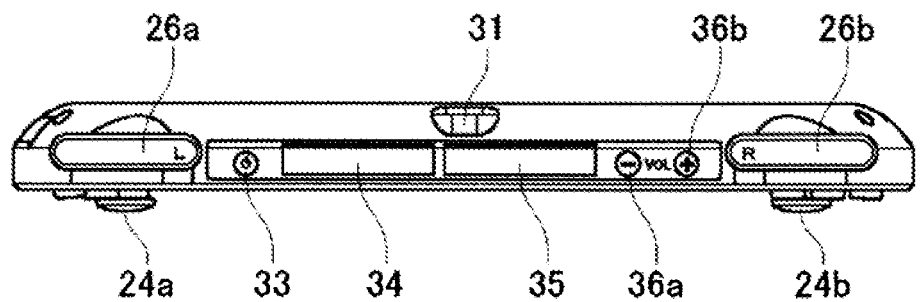
FIG. 2(*a*) is a diagram showing the top surface of the game device.
Figure 2:
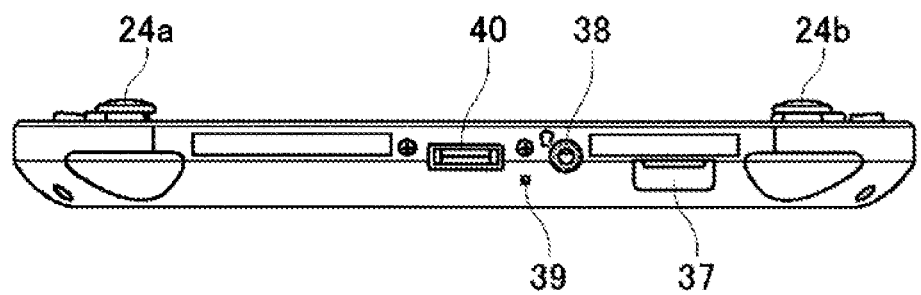
Figure 2:
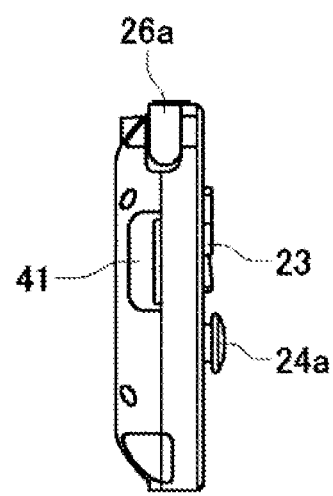

FIG. 2(*a*) shows the top view of the game device 10. As described previously, at the left and right edges of the top surface of the game device 10 are provided the L button 26*a* and the R button 26*b*, respectively. At the right of the L button 26*a*, a power button 33 is provided. A user turns the power on or off by pressing the power button 33. The game device 10 is provided with a power control function that makes a transition to a suspend state if a time period during which no operation is input (non-operation time period) lasts for a predetermined time period. If the game device 10 enters the suspend state, a user can return the game device 10 from the suspend state to an awake state by pressing the power button 33.

A game card slot 34 is a slot for inserting a game card. This diagram shows the game card slot 34 that is covered by a slot cover. In the vicinity of the game card slot 34, an LED lamp may be provided that blinks when a game card is accessed. An accessory terminal 35 is a terminal for connecting a peripheral device (accessory). This diagram shows the accessory terminal 35 that is covered by a terminal cover. Between the accessory terminal 35 and the R button 26*b* are provided a minus button 36*a* and a plus button 36*b* for adjusting volume.

Structure of the Bottom Surface

FIG. 2(*b*) shows the bottom view of the game device 10. A memory card slot 37 is a slot for inserting a memory card. This diagram shows the memory card slot 37 that is covered by a slot cover. On the bottom surface of the game device 10 are provided an audio input and output terminal 38, a microphone 39, and a multi-use terminal 40. The multi-use terminal 40 supports Universal Serial Bus (USB), and can be connected to another device via a USB cable.

Structure of the Left Side

FIG. 2(*c*) shows the left side view of the game device 10. On the left side face of the game device 10 is provided a SIM card slot 41, which is a slot for inserting a SIM card.

Circuit Configuration of the Game Device

Figure 3:
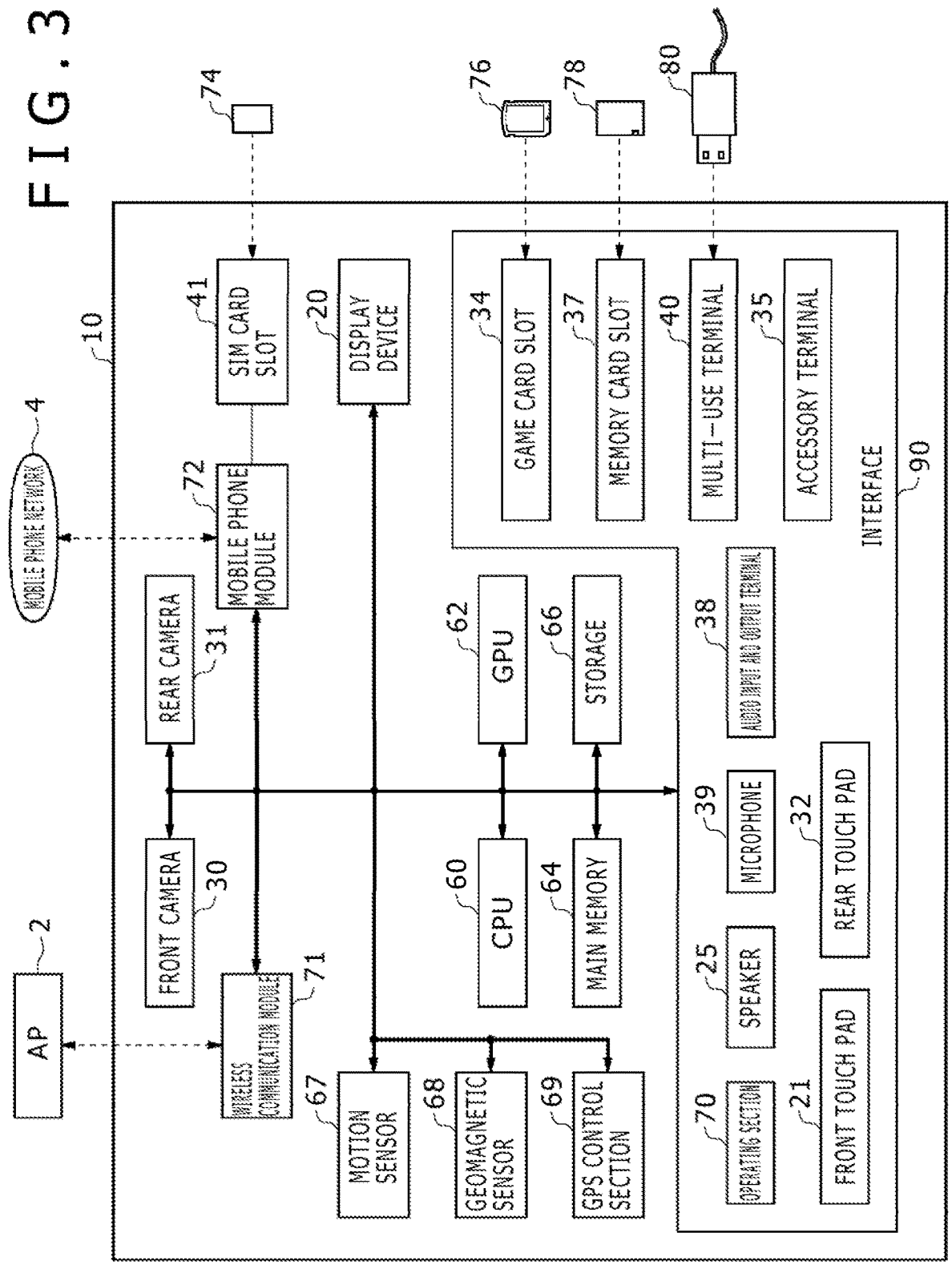
FIG. 3 is a diagram showing a circuit configuration of the game device.

FIG. 3 shows the circuit configuration of the game device 10. Respective elements thereof are connected to one another via a bus 92. A wireless communication module 71 includes a wireless LAN module that complies with a communication standard such as IEEE802.11b/g or the like. The wireless communication module 71 is connected to an external network via an AP2. The wireless communication module 71 may be provided with a Bluetooth (registered trademark) protocol communication function. A mobile phone module 72 supports the 3rd Generation digital mobile phone system that complies with the International Mobile Telecommunication 2000 (IMT-2000) Standard defined by the International Telecommunication Union (ITU). The mobile phone module 72 is connected to a mobile phone network 4. Inserted in the SIM card slot 41 is a SIM card 74, on which unique ID numbers for identifying the telephone number of a mobile phone is stored. As a result of the SIM card 74 being inserted in the SIM card slot 41, the mobile phone module 72 can communicate with the mobile phone network 4.

A Central Processing Unit (CPU) 60 executes a program or the like loaded onto a main memory 64. A Graphics Processing Unit (GPU) 62 performs calculations required for image processing. The main memory 64 is configured with Random Access Memory (RAM) or the like, and stores a program and/or data to be used by the CPU 60. A storage 66 is configured with a NAND-type flash memory or the like, and is utilized as a built-in auxiliary storage device.

A motion sensor 67 detects the movement of the game device 10, and a geomagnetic sensor 68 detects earthgeomagnetism in each of the three-axis directions. A GPS control section 69 receives signals from the GPS satellites and calculates the current position. The front camera 30 and the rear camera 31 capture an image and input the image data thereof. The front camera 30 and the rear camera 31 are configured with a Complementary Metal Oxide Semiconductor (CMOS) image sensor.

The display device 20 is an organic EL display device, and provided with a light emitting element which emits light when a voltage is applied between a negative electrode and a positive electrode. During power saving mode, by reducing the voltage to be applied between the electrodes to a level below that of a normal mode, the display device 20 can be turned into a low-light state. Thus, the power consumption can be restricted. Alternatively, the display device 20 may be a liquid crystal panel display device provided with a backlight. During power saving mode, by reducing the light intensity of the backlight, the liquid crystal panel display device can be turned into a low-light state. Thus, the power consumption can be restricted.

In an interface 90, an operating section 70 includes various manipulation means provided in the game device 10. More specifically, the operating section 70 includes the control buttons 22, the directional keys 23, the analogue sticks 24, the L button 26a, the R button 26b, the HOME button 27, the START button 28, the SELECT button 29, the power button 33, the minus button 36a, and the plus button 36b. The front touch pad 21 and the rear touch pad 32 are a multi-touch pad. The front touch pad 21 is arranged so as to be overlaid on the surface of the display device 20. The speaker 25 outputs sound generated by respective functions of the game device 10. The microphone 39 inputs sound from around the game device 10. The audio input and output terminal 38 inputs stereo sound from an external microphone and outputs stereo sound to an external headphone or the like.

In the game card slot 34, a game card 76 that stores a game file is inserted. The game card 76 is provided with a storage area where data can be written. If the game card 76 is placed in the game card slot 34, data is written/read by a media drive. In the memory card slot 37, a memory card 78 is inserted. When the memory card 78 is placed into the memory card slot 37, the memory card 78 is utilized as an external auxiliary storage device. The multi-use terminal 40 can be utilized as a USB terminal. The multi-use terminal 40 is connected to a USB cable 80 and transmits data to and receives data from another USB device. To the accessory terminal 35, a peripheral device is connected.

Figure 4:
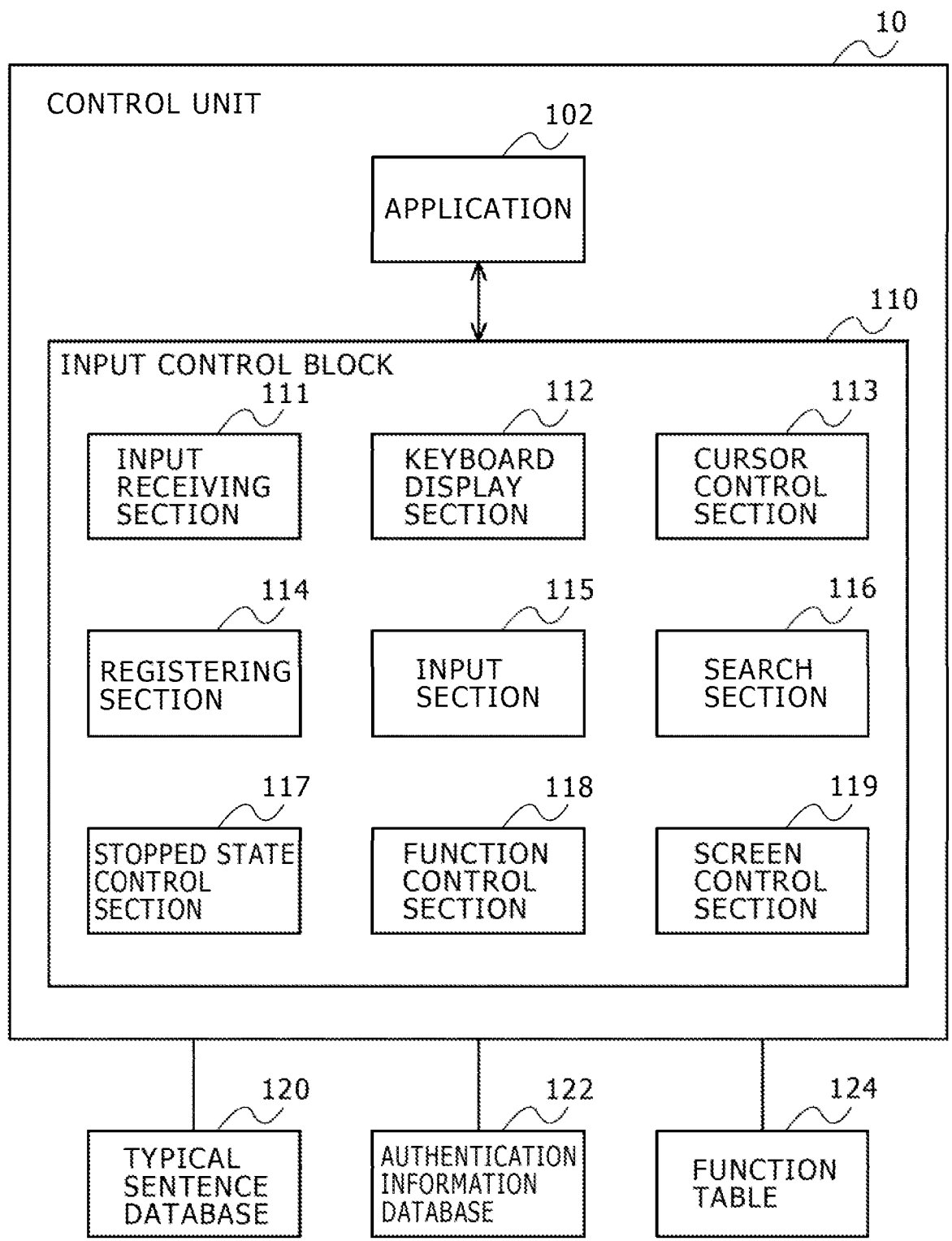
FIG. 4 is a diagram showing a functional configuration of the game device according to an embodiment.

FIG. 4 shows a functional configuration of the game device 10 according to the embodiment. The game device 10 includes an application 102, an input control block 110, a typical sentence database 120, an authentication information database 122, and a function table 124. The input control block 110 includes an input receiving section 111, a keyboard display section 112, a cursor control section 113, a registering section 114, an input section 115, a search section 116, a stopped state control section 117, a function control section 118, and a screen control section 119. These configurations can also be implemented in various forms by only hardware, only software, or a combination of hardware and software. The operations and functions of the respective configurations will be described below in detail with reference to the drawings.

Input Using the Rear Touch Pad

Figure 5:
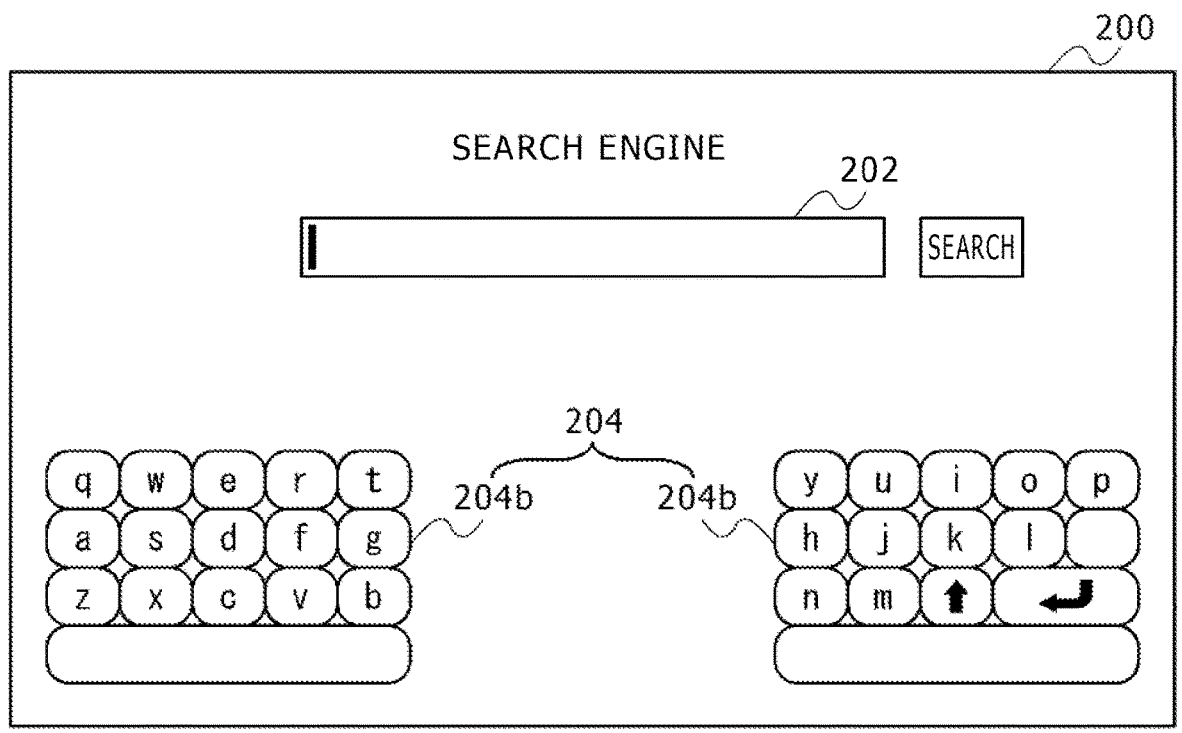
FIG. 5 is a diagram showing an example of a screen displayed on a display device.

FIG. 5 shows an example of a screen displayed on the display device. In order to input a character string to a text input region 202 of the screen 200 displayed by the application 102 having functions of a web browser, an on-screen keyboard 204 is displayed on the screen 200. The keyboard display section 112 displays the on-screen keyboard 204 in a state of being divided into a left keyboard part 204a and a right keyboard part 204b. Therefore, keys can be arranged at positions easily reached by the fingers of a user when the on-screen keyboard 204 is operated while the game device 10 is held by a left hand and a right hand. Thus, the convenience of the user can be improved. In addition, a region between the left keyboard part 204a and the right keyboard part 204b can be used for displaying the screen of the application 102. Thus, the display region can be used effectively. The keyboard display section 112 may display the on-screen keyboard 204 in a state of being divided into three or more parts. In addition, the keyboard display section 112 may display the on-screen keyboard 204 in a state of being divided into an upper part and a lower part.

Figure 6:
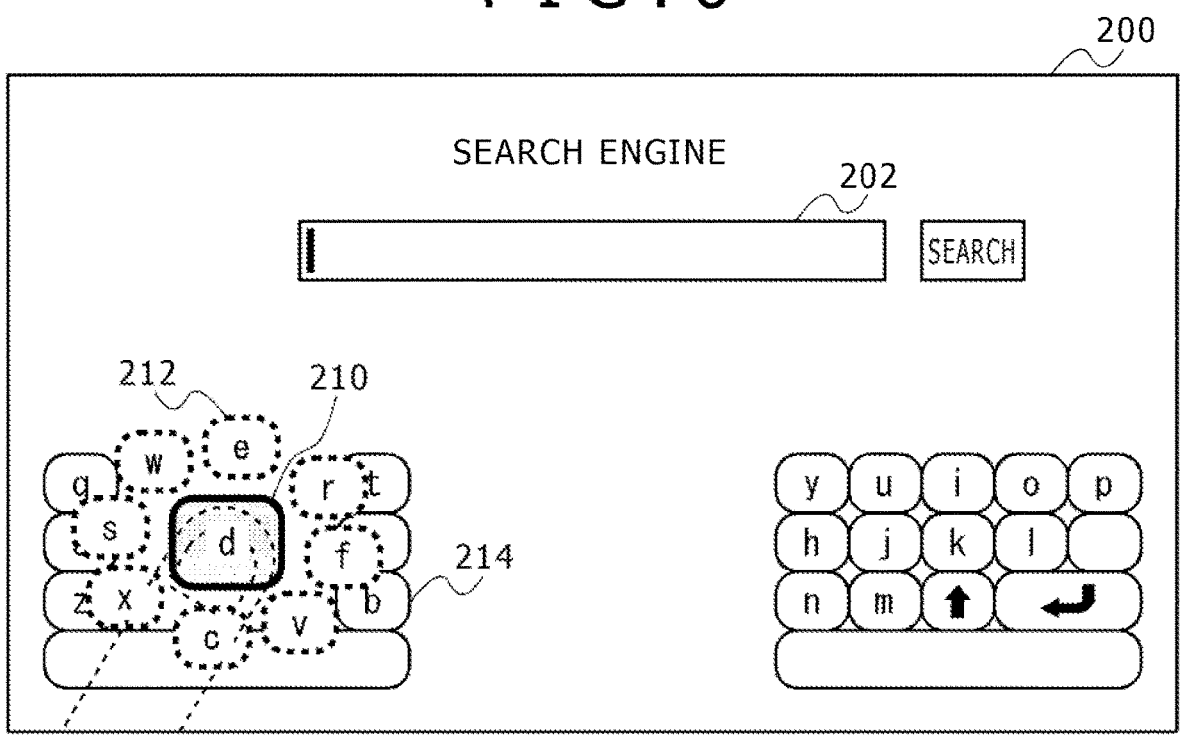
FIG. 6 is a diagram showing an example of a screen displayed on the display device.

FIG. 6 shows an example of a screen displayed on the display device. When the keyboard display section 112 receives a tap input to the rear touch pad 32 as a first operation input for displaying a part of the on-screen keyboard 204 in an enlarged state while the on-screen keyboard 204 is displayed on the screen 200, the keyboard display section 112 determines a key 210 displayed at a position of the screen 200 which position corresponds to a position at which the tap input is received, and displays the determined key 210 in an enlarged state. This can facilitate key input and reduce input errors even when each individual key included in the on-screen keyboard 204 is provided with a small display region. In addition, the on-screen keyboard can be operated without being hidden by fingers. Thus, the operability of the on-screen keyboard can be improved. The keyboard display section 112 further changes the arrangement positions of keys 212 such that distances between the keys 212 around the key 210 and the key 210 are lengthened. That is, the arrangement positions of the keys 212 are spread radially with the display position of the key 210 as a center. This can reduce a possibility of a key 212 being erroneously pressed as the key 210. Thus, the convenience of the user can be improved. The keyboard display section 112 arranges the plurality of keys 212 such that the arrangement positions of the adjacent keys are shifted both in a vertical direction and a horizontal direction. This can reduce a possibility of the adjacent keys 212 being erroneously pressed. Thus, the convenience of the user can be improved. The keyboard display section 112 may display the key 210 displayed in an enlarged state and the keys 212 around the key 210 in a display mode different from that of other keys 214. In addition, the keyboard display section 112 may disable input of the other keys 214 by displaying the other keys 214 in a grayed-out state. This can reduce a possibility of the user erroneously inputting a key other than a key that the user intends to input.

When the input receiving section 111 receives a tap input to the front touch pad 21 as a second operation input for determining a key to be input while the on-screen keyboard 204 is displayed on the screen 200, the input receiving section 111 determines the key displayed at the position at which the tap input is received, and receives the input of the determined key. Information on the key whose input is received is output to the application 102 as it is, or output to the application 102 after being converted into another character type by a converting program or the like. The input receiving section 111 may receive the input of various kinds of buttons of the operating section 70 as the second operation input. In this case, the input receiving section 111 may receive the input of a key displayed in an enlarged state when the second operation input is received. The input receiving section 111 may receive a tap input to the rear touch pad 32 as the second operation input. In this case, the keyboard display section 112 may display the on-screen keyboard 204 on the screen 200 while input to the rear touch pad 32 is continued after the first operation input to the rear touch pad 32 is received, and the input receiving section 111 may receive an operation of detaching the finger of the user from the rear touch pad 32 as the second operation input, and receive the input of a key displayed at a position where the finger is detached. Alternatively, the keyboard display section 112 may display the on-screen keyboard 204 on the screen 200 even when the finger of the user is detached from the rear touch pad 32 after the first operation input is received, and the input receiving section 111 may receive another input to the rear touch pad 32 as the second operation input, and receive the input of a key displayed at a position at which the tap input is received. The keyboard display section 112 may receive an input to the rear touch pad 32 as the first operation input, and the input receiving section 111 may receive an input to the front touch pad 21 as the second operation input. In this case, the first operation input and the second operation input may be performed independently of each other. Specifically, the input receiving section 111 may receive the second operation input and receive the input of a key regardless of whether or not the keyboard display section 112 has received the first operation input, or the keyboard display section 112 may receive the first operation input and display a key in an enlarged state regardless of whether or not the input receiving section 111 has received the second operation input.

Figure 7:
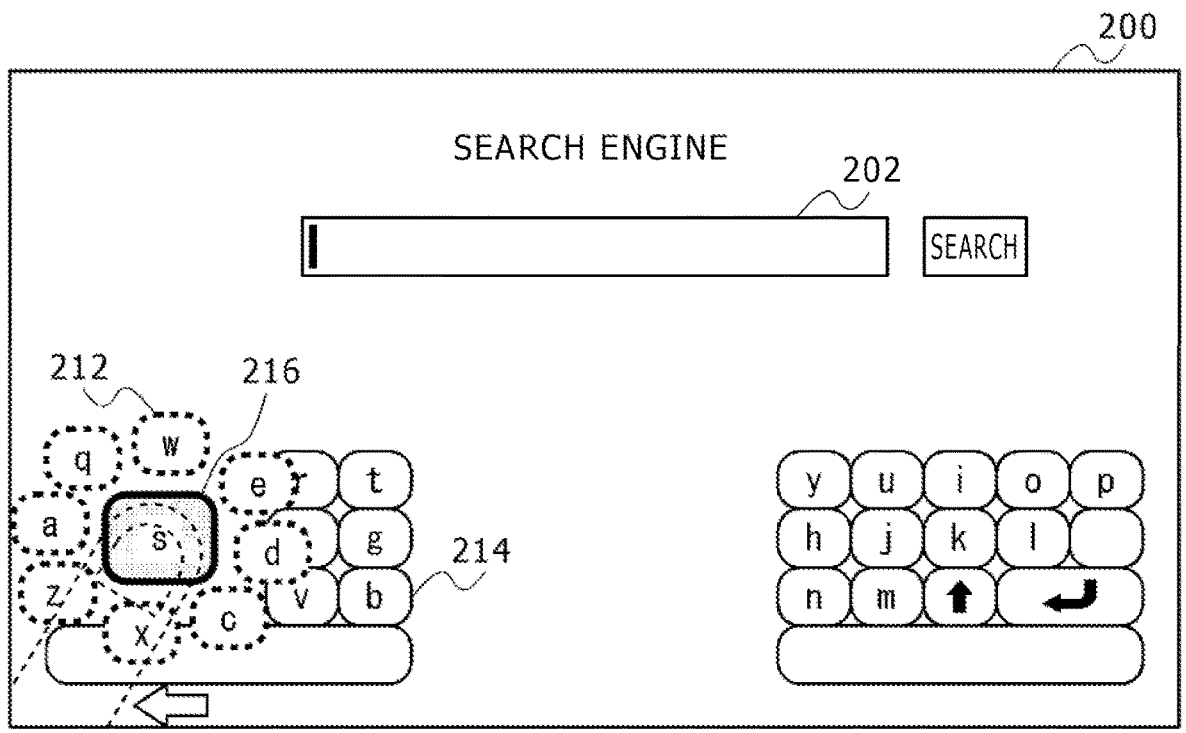
FIG. 7 is a diagram showing an example of a screen displayed on the display device.

FIG. 7 shows an example of a screen displayed on the display device. During display of a part of the on-screen keyboard 204 in an enlarged state, when the keyboard display section 112 receives a movement of the position of an input to the rear touch pad 32 as a third operation input for changing the key displayed in the enlarged state, the keyboard display section 112 changes the key 210 displayed in the enlarged state. When the keyboard display section 112 is notified that the position of the input to the rear touch pad 32 is shifted as a result of the user shifting a finger while the finger is touching the rear touch pad 32, the keyboard display section 112 determines a key 216 corresponding to a present input position, and displays the determined key 216 in an enlarged state. In determining the key to be displayed in the enlarged state according to a change in the position of the input to the rear touch pad 32 when the key 210 is displayed in the enlarged state, the keyboard display section 112 may determine the key corresponding to the input position using, as a reference, the on-screen keyboard 204 shown in FIG. 6 with the key 210 displayed in the enlarged state, or may determine the key corresponding to the input position using, as a reference, the original on-screen keyboard 204 shown in FIG. 5. In the former case, the key displayed in the enlarged state is not changed even when the finger of the user is shifted slightly, so that input errors can be reduced. In the latter case, the key displayed in the enlarged state can be changed smoothly according to the movement of the finger of the user. The keyboard display section 112 may receive a direction input from a directional key 23, an analogue stick 24, the L button 26a, the R button 26b, or the like as the third operation input, and move the key displayed in the enlarged state in the input direction. In addition, the keyboard display section 112 may receive, as the third operation input, a direction in which the game device 10 is moved or a direction in which the game device 10 is rotated from the motion sensor 67, the geomagnetic sensor 68, or the like, and move the key displayed in the enlarged state in the direction in which the game device 10 is moved or rotated. In addition, the keyboard display section 112 may receive a drag input, a flick input, or the like to the front touch pad 21 or the rear touch pad 32 as the third operation input. When the keyboard display section 112 receives the third operation input while the input receiving section 111 is receiving the second operation input, the keyboard display section 112 may move the key displayed in the enlarged state, or may not move the key displayed in the enlarged state. For example, while the input receiving section 111 is receiving the second operation input to the front touch pad 21, that is, while the user continues touching the front touch pad 21, the keyboard display section 112 may move the key displayed in the enlarged state or may not move the key displayed in the enlarged state as the position of the tap input to the rear touch pad 32 is changed. When the key displayed in the enlarged state is moved, the user can change the key displayed in the enlarged state and thus change the input key by changing the touch position on the rear touch pad 32 while the user is touching the front touch pad 21. When the key displayed in the enlarged state is not moved, the user can change the input key by changing the touch position on the front touch pad 21 while maintaining the state of enlarged display of the key by touching the rear touch pad 32.

Figure 8:
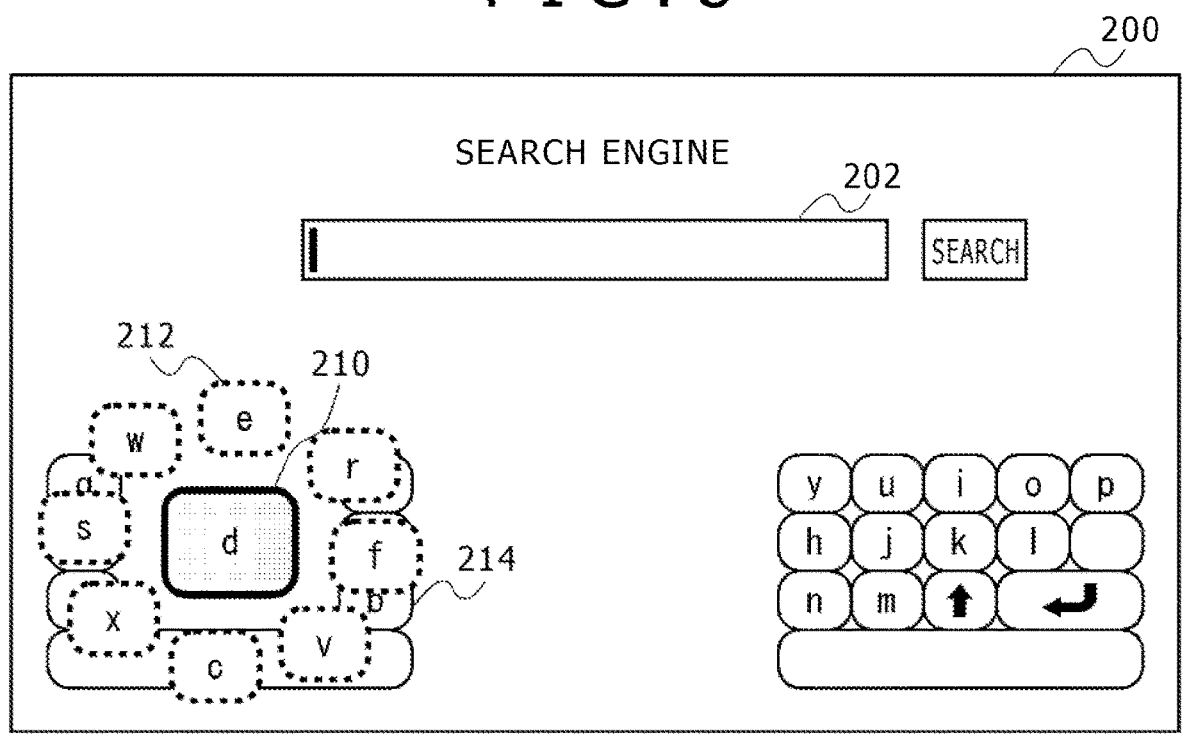
FIG. 8 is a diagram showing an example of a screen displayed on the display device.

FIG. 8 shows an example of a screen displayed on the display device. The keyboard display section 112 adjusts an enlargement ratio of the key 210 and arrangement intervals of the keys 212 according to the strength or time of the input to the rear touch pad 32. The stronger the strength of the input to the rear touch pad 32 is, and the longer the duration of the input to the rear touch pad 32 is, the more the keyboard display section 112 increases the enlargement ratio of the key 210 and the arrangement intervals of the keys 212 as shown in FIG. 8. The enlargement ratio of the key 210 and the arrangement intervals of the keys 212 may be set by the user. In addition, the keyboard display section 112 may record a history of user inputs, and determine and set the enlargement ratio and the arrangement intervals suitable for the user. When the keyboard display section 112 receives the first operation input, the keyboard display section 112 displays the key 210 and the keys 212 to which the set enlargement ratio and the set arrangement intervals are applied. This can reduce key input errors, and thus improve the convenience of the user.

The keyboard display section 112 may set a key as a home position in advance, and display the key set as the home position in an enlarged state when receiving a tap input to the rear touch pad 32. The keyboard display section 112 may set a home position in each of the left keyboard part 204a and the right keyboard part 204b. The keyboard display section 112 may display a key set as the home position of the left keyboard part 204a in an enlarged state when receiving a tap input to a predetermined left region of the rear touch pad 32, and display a key set as the home position of the right keyboard part 204b in an enlarged state when receiving a tap input to a predetermined right region of the rear touch pad 32. When a key as a home position is set in advance, the keyboard display section 112 may receive an input to the front touch pad 21, various kinds of buttons of the operating section 70, or the like as the first operation input, display the key set as the home position in an enlarged state, and change the arrangement of surrounding keys.

Input Using an Inclination Sensor

Figure 9:
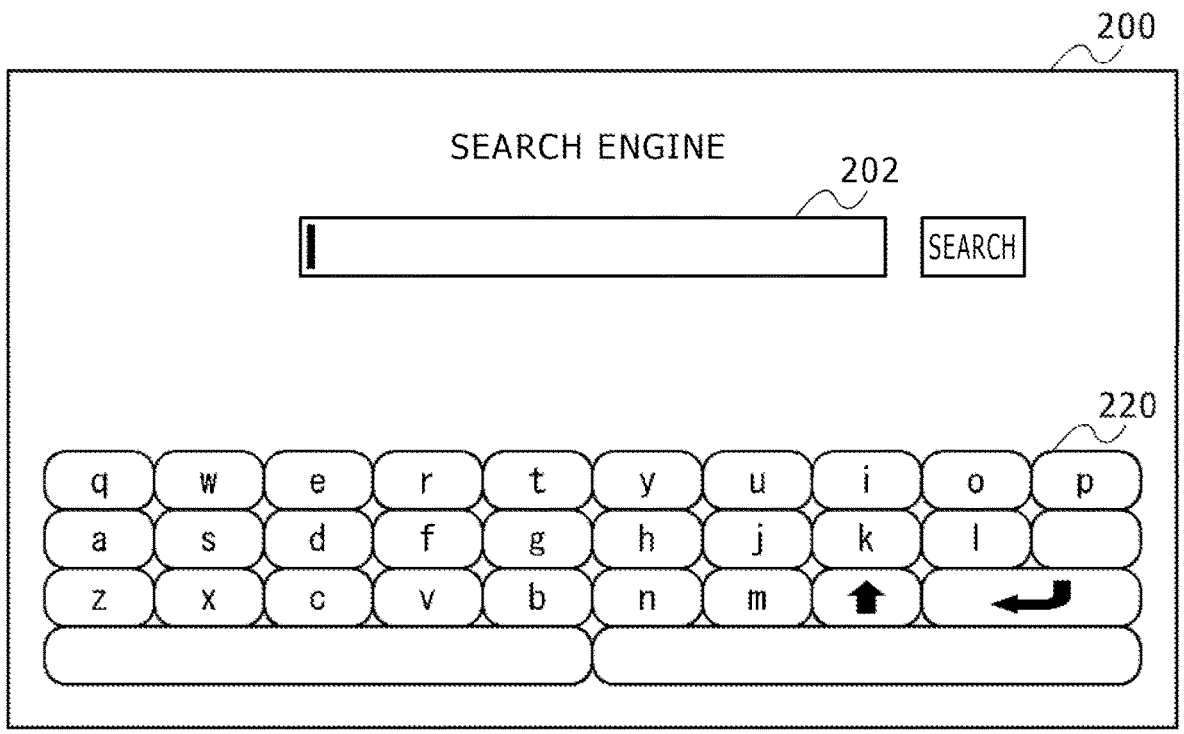
FIG. 9 is a diagram showing an example of a screen displayed on the display device.

FIG. 9 shows an example of a screen displayed on the display device. In order to input a character string to the text input region 202 of the screen 200 displayed by the application 102 having functions of a web browser, the on-screen keyboard 220 is displayed on the screen 200.

Figure 10:
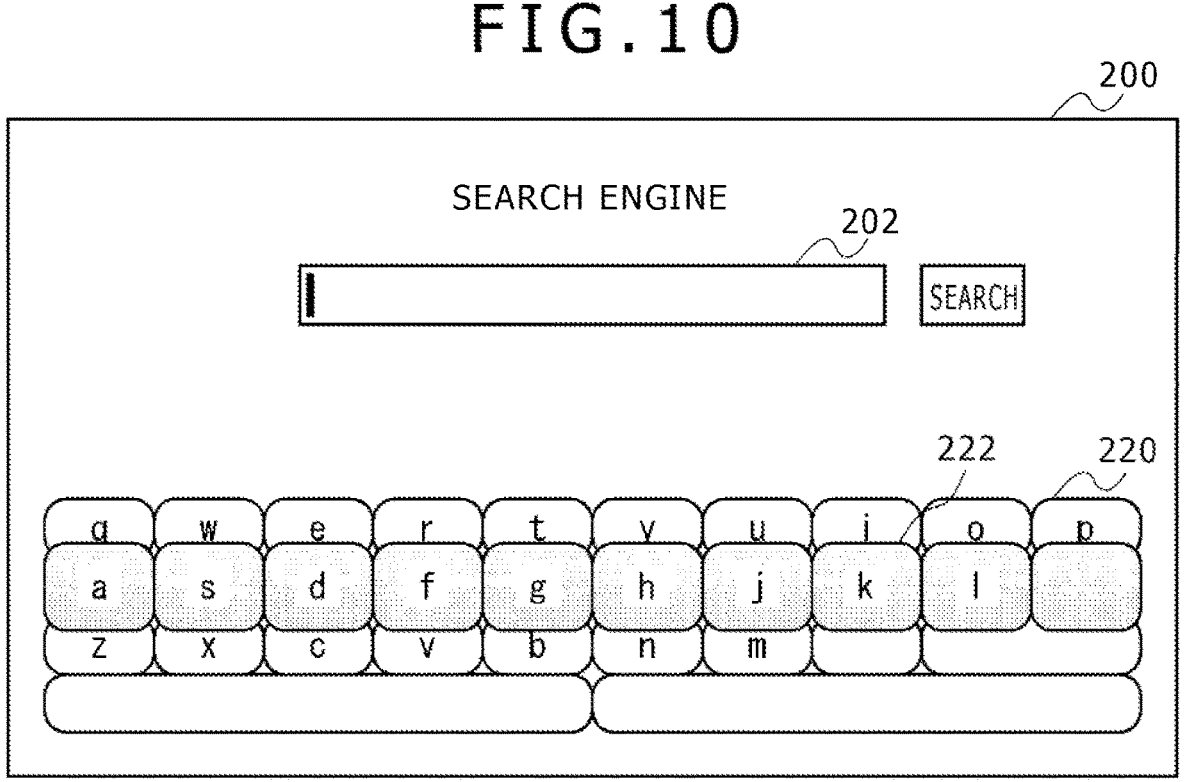
FIG. 10 is a diagram showing an example of a screen displayed on the display device.

FIG. 10 shows an example of a screen displayed on the display device. The keyboard display section 112 obtains information on the orientation of the game device 10 from the motion sensor 67, the geomagnetic sensor 68, the GPS control section 69, and the like, and determines a region to be displayed in an enlarged state 222 in an on-screen keyboard 220 according to the orientation of the game device 10. The keyboard display section 112 sets, in advance, a reference orientation of the game device 10 when the user holds the game device 10, and determines a region to be displayed in an enlarged state 222 according to an angle of rotation from the reference orientation. The keyboard display section 112 obtains the angle of rotation about the longitudinal direction (horizontal direction) of the game device 10 as an axis of rotation. The keyboard display section 112 displays an uppermost row of the on-screen keyboard 220 in an enlarged state 222 when the game device 10 is tilted by equal to or more than a predetermined angle in a direction of tilting an upper portion of the game device 10 to the rear, displays a second row of the on-screen keyboard 220 in an enlarged state 222 when the game device 10 is tilted up to the predetermined angle from the reference angle, displays a third row of the on-screen keyboard 220 in an enlarged state 222 when the game device 10 is tilted up to the predetermined angle from the reference angle in an opposite direction, and displays a fourth row of the on-screen keyboard 220 in an enlarged state 222 when the game device 10 is tilted by equal to or more than the predetermined angle in a direction of pulling the upper portion of the game device 10 to the front. In the example shown in FIG. 10, the second row is displayed in an enlarged state 222. The keyboard display section 112 may display the region to be displayed in an enlarged state 222 in a different display mode from that of other regions, or may change the display position of the region to be displayed in an enlarged state 222. The keyboard display section 112 may display, in a reduced state, the regions other than the region to be displayed in an enlarged state 222, or may disable input in the regions other than the region to be displayed in an enlarged state 222 by displaying, in a grayed-out state, the regions other than the region to be displayed in an enlarged state 222. This can facilitate input, and reduce input errors.

Figure 11:
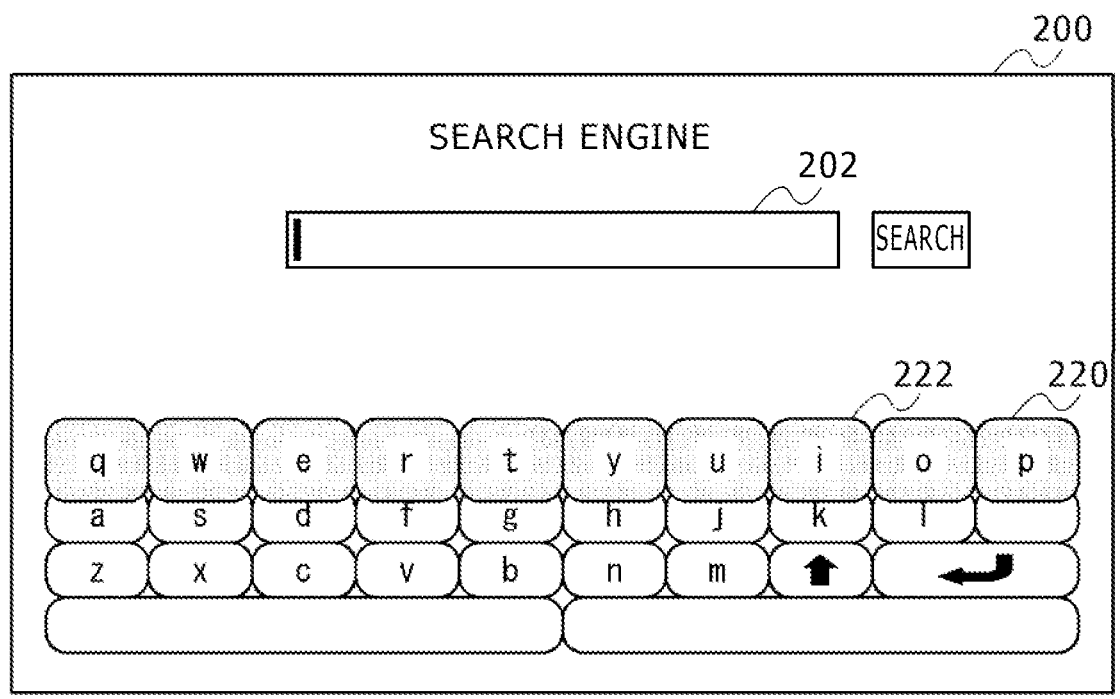
FIG. 11 is a diagram showing an example of a screen displayed on the display device.

FIG. 11 shows an example of a screen displayed on the display device. When the game device 10 is further tilted from the state shown in FIG. 10, the keyboard display section 112 changes the region displayed in the enlarged state 222. In the example shown in FIG. 11, the first row is displayed in an enlarged state 222. When changing the region displayed in the enlarged state 222, the keyboard display section 112 may provide the angle ranges with hysteresis.

Figure 12:
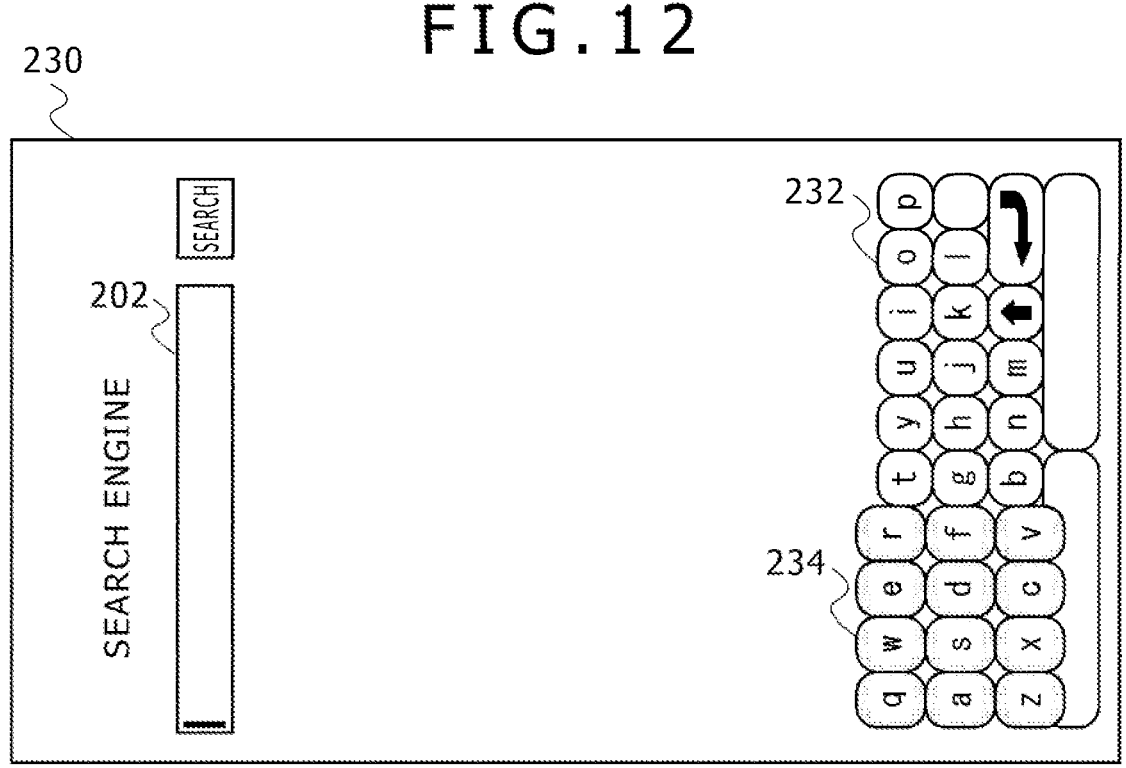
FIG. 12 is a diagram showing an example of a screen displayed on the display device.

FIG. 12 shows an example of a screen displayed on the display device. In the example shown in FIG. 12, a vertically long screen 230 is displayed, and an on-screen keyboard 232 is displayed in a lower portion of the screen 230. The keyboard display section 112 obtains an angle of rotation about the longitudinal direction (vertical direction) of the game device 10 as an axis of rotation, and determines a region 234 to be displayed in an enlarged state.

Figure 13:
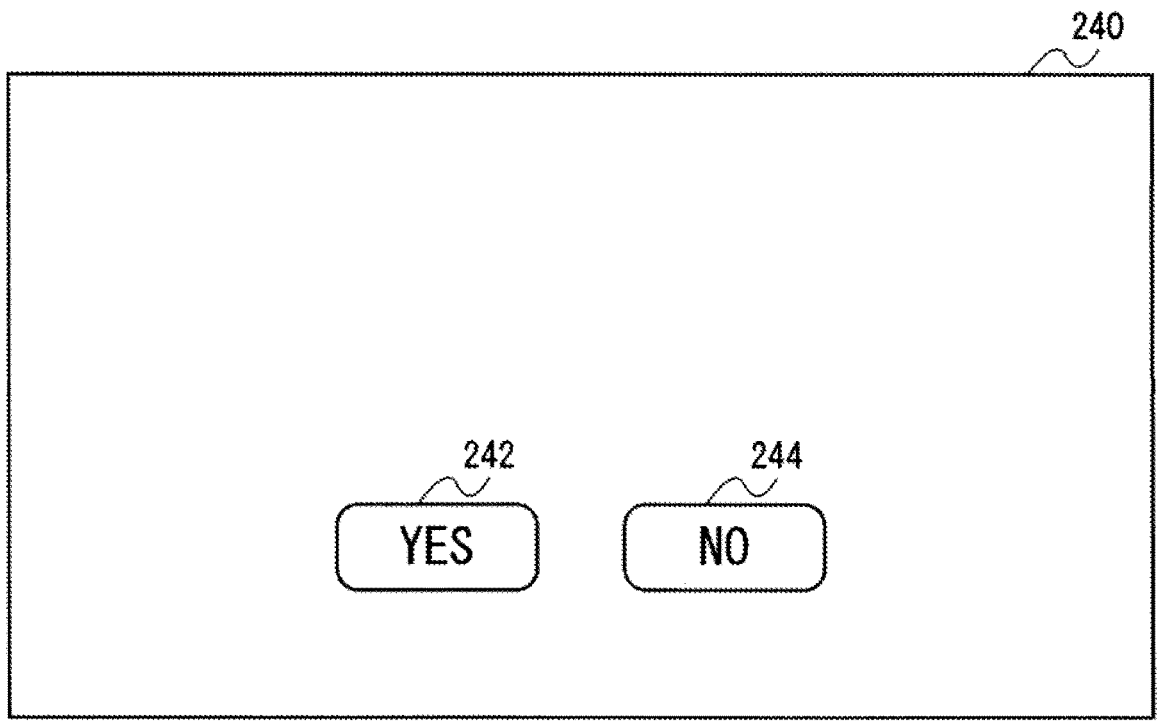
FIG. 13 is a diagram showing an example of a screen displayed on the display device.

FIG. 13 shows an example of a screen displayed on the display device. The above description has been made of an example in which a part of the on-screen keyboard is displayed in an enlarged state. However, a similar technology can be applied also to cases where a plurality of input regions are displayed. In the example shown in FIG. 13, a YES button 242 and a NO button 244 are displayed on a screen 240.

Figure 14:
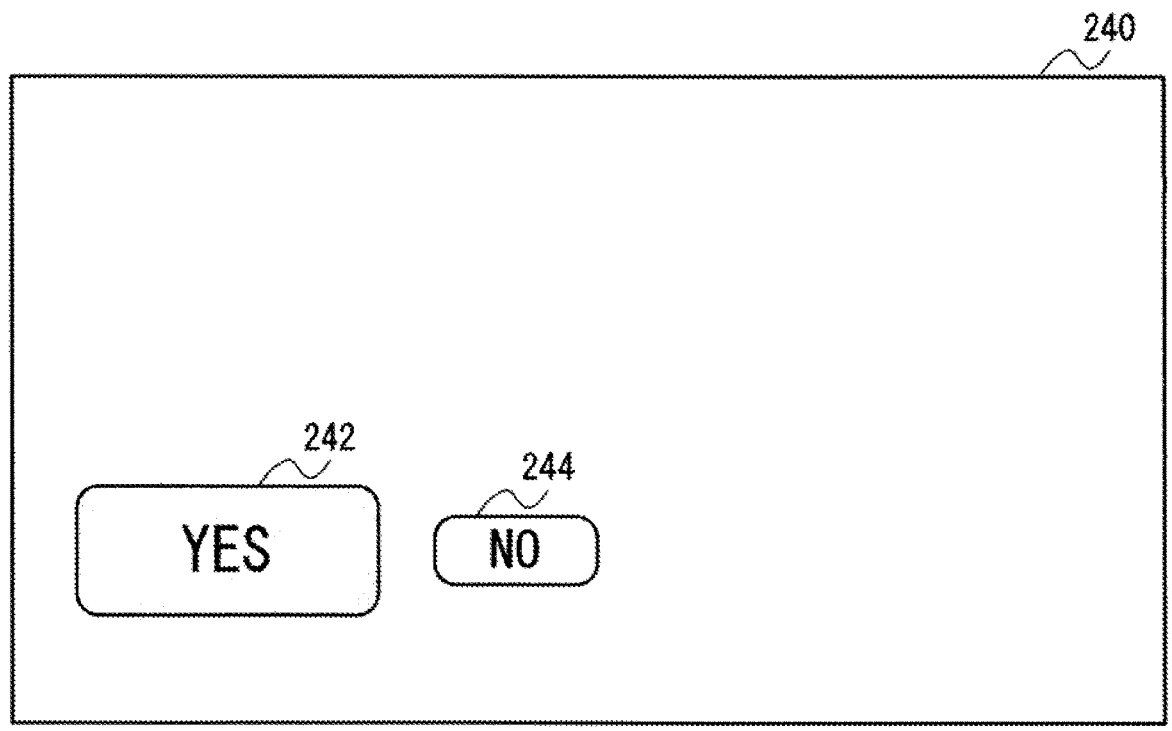
FIG. 14 is a diagram showing an example of a screen displayed on the display device.

FIG. 14 shows an example of a screen displayed on the display device. When the user tilts the game device 10 to the left, a display section not shown in the figures moves the YES button 242 and the NO button 244 to the left side of the screen 240, and displays the YES button 242 in an enlarged state and displays the NO button 244 in a grayed-out state. This can facilitate the input of the YES button 242 displayed on the left side of the screen 240.

According to such a technology, it is possible to facilitate input and reduce input errors even in such a situation that the game device 10 is held by both hands and thus operation input that can be performed is limited. In addition, because a region in which the user intends to perform input is displayed in an enlarged state appropriately, the original input region can be displayed in a small size, so that the screen can be utilized effectively. In addition, because the region to be displayed in an enlarged state can be changed without the screen being hidden by fingers or the like, input can be performed while the input region is visually recognized.

Cursor Control Using the Rear Touch Panel

Figure 15:
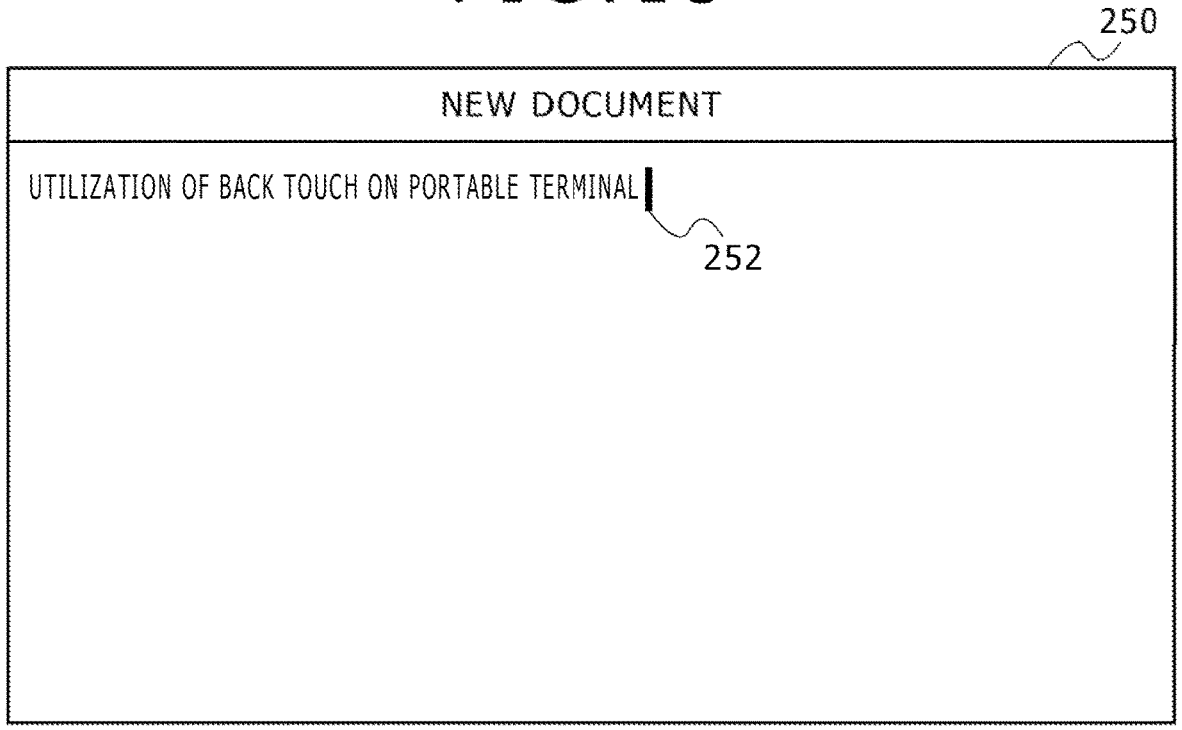
FIG. 15 is a diagram showing an example of a screen displayed on the display device.
Figure 16:
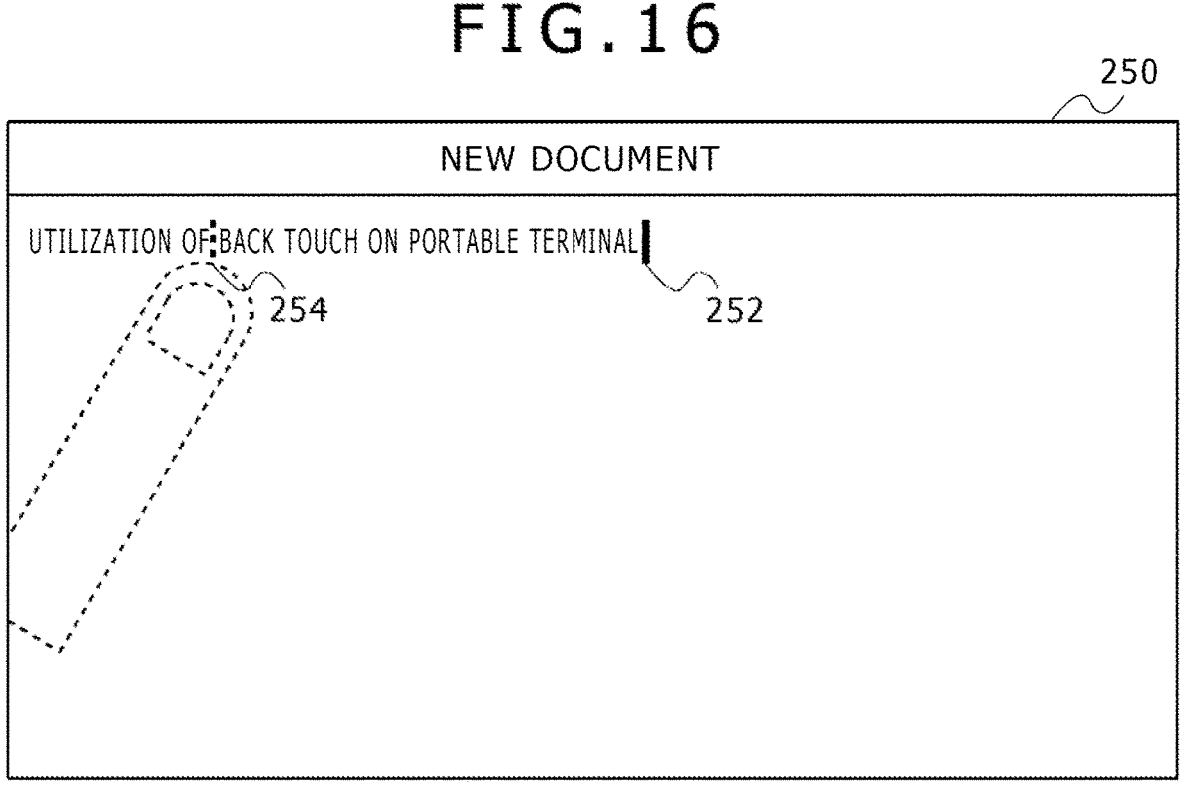
FIG. 16 is a diagram showing an example of a screen displayed on the display device.

FIG. 15 shows an example of a screen displayed on the display device. The cursor control section 113 displays a front cursor 252 at a present input position on a screen 250 for receiving the input of text. When the cursor control section 113 receives a tap input to the front touch pad 21, the cursor control section 113 moves the front cursor 252 to a tapped position. When the cursor control section 113 receives a tap input to the rear touch pad 32, the cursor control section 113 displays a back cursor 254 at a position of the screen 250 which position corresponds to a tapped position as shown in FIG. 16. When the cursor control section 113 receives another tap input to the rear touch pad 32, the cursor control section 113 moves the back cursor 254 to a position of the screen 250 which position corresponds to a tapped position. When the cursor control section 113 receives tap inputs by a plurality of fingers, the cursor control section 113 may move the front cursor 252 or the back cursor 254 in row units or word units.

Figure 17:
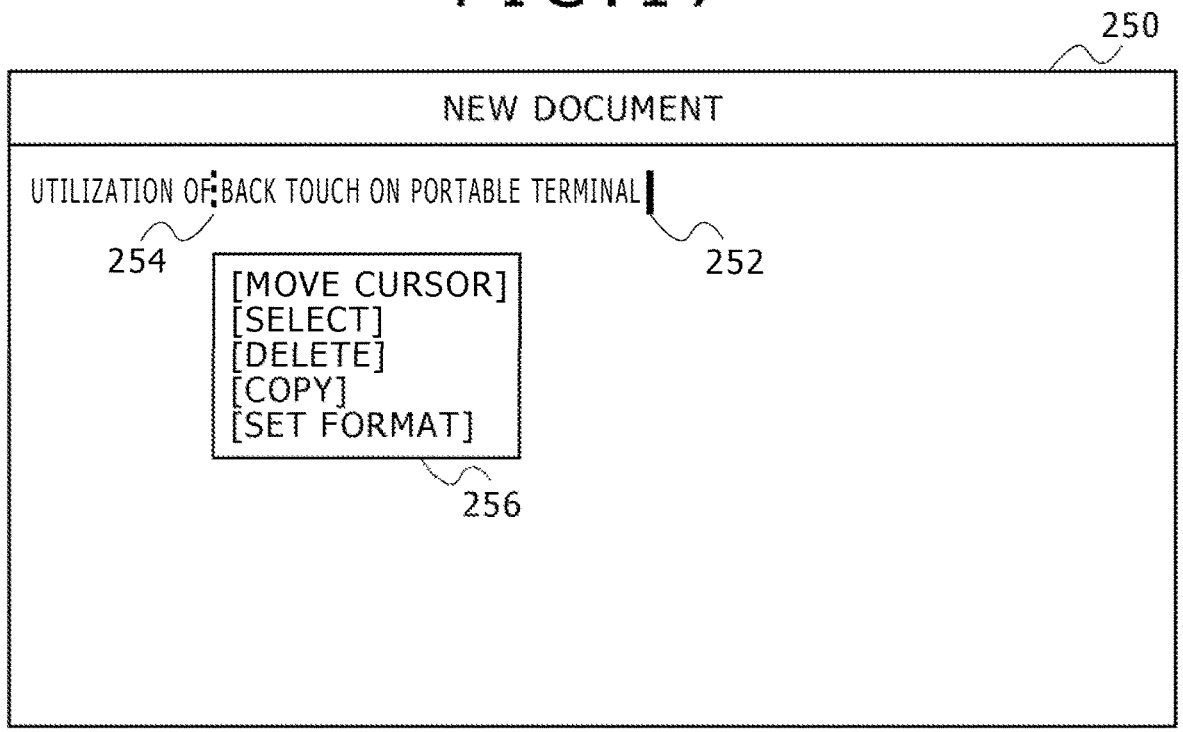
FIG. 17 is a diagram showing an example of a screen displayed on the display device.

FIG. 17 shows an example of a screen displayed on the display device. When the cursor control section 113 receives a tap input to the rear touch pad 32 for a predetermined time or more or a tap input of a predetermined strength or more to the rear touch pad 32, the cursor control section 113 displays a menu screen 256 for receiving an operation on a character string in a range between the front cursor 252 and the back cursor 254. When the user gives an instruction for cursor movement on the menu screen 256, the cursor control section 113 moves the front cursor 252 to the position of the back cursor 254. When the user gives an instruction for range selection, deletion, or copying, the cursor control section 113 selects, deletes, or copies the character string in the range between the front cursor 252 and the back cursor 254. When the user gives an instruction for setting a format in the range, the cursor control section 113 calls a screen for setting the format of the character string in the range between the front cursor 252 and the back cursor 254.

The cursor control section 113 may receive an instruction from the user on the menu screen 256 via the front touch pad 21, or may receive an instruction from the user on the menu screen 256 via the rear touch pad 32. In the latter case, the cursor control section 113 may display the menu screen 256 when receiving a tap input to the rear touch pad 32 for a predetermined time or more or a tap input of a predetermined strength or more to the rear touch pad 32, and thereafter receive an instruction from the user on the basis of another input to the rear touch pad 32. Alternatively, the cursor control section 113 may display the menu screen 256 while the input to the rear touch pad 32 is continued, and when the finger is detached from the rear touch pad 32, the cursor control section 113 may receive an instruction displayed at a position corresponding to a position from which the finger is detached.

According to such a technology, the position of the back cursor 254 can be controlled by an input to the rear touch pad 32. Thus, a change of an input position, range selection, and the like can be made without fingers hiding text displayed on the screen 250 or the like. In addition, the menu screen 256 is displayed when a tap input to the rear touch pad 32 for a predetermined time or more or a tap input of a predetermined strength or more to the rear touch pad 32 is received. Thus, the text being input is not essentially affected even when the rear touch pad 32 is touched erroneously. Hence, erroneous operations during the input are reduced, and quick operations can be realized.

Inputting a Typical Sentence by Gesture Input

Figure 18:
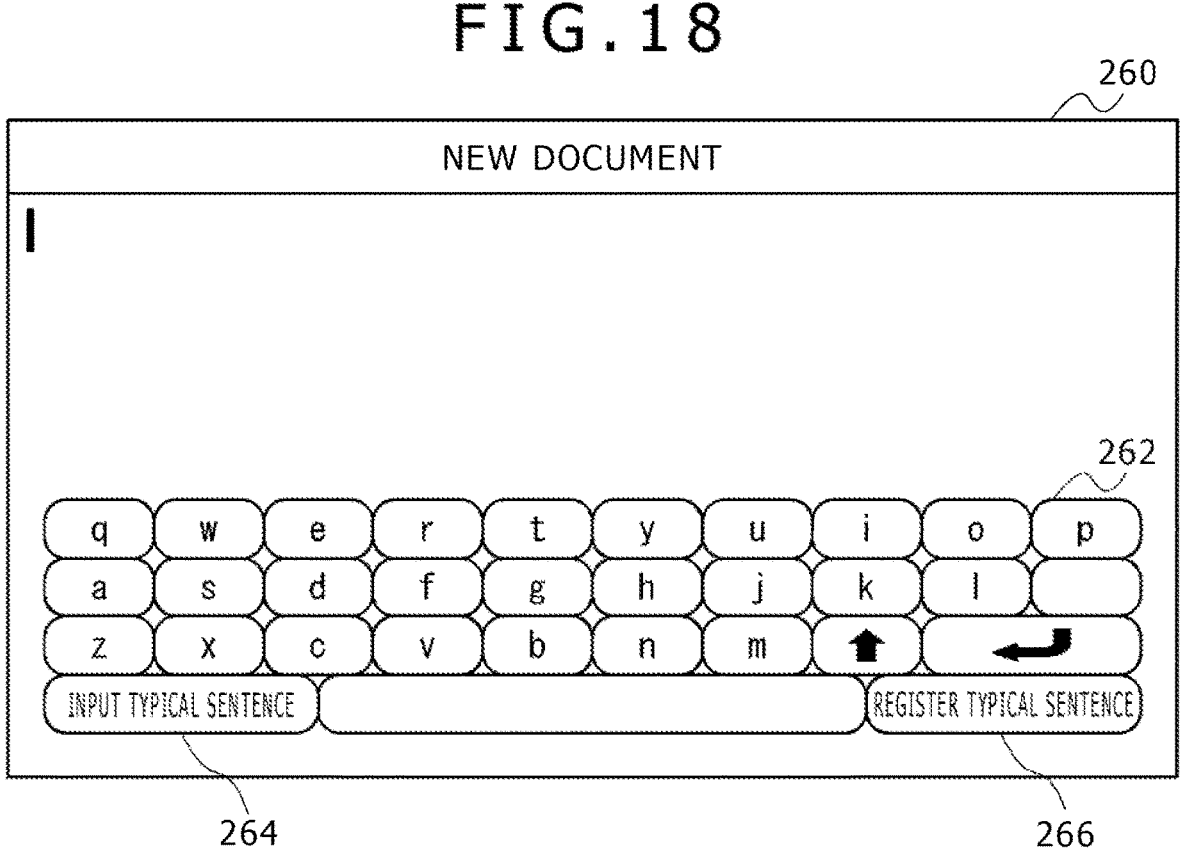
FIG. 18 is a diagram showing an example of a screen displayed on the display device.

FIG. 18 shows an example of a screen displayed on the display device. An on-screen keyboard 262 for inputting a character string is displayed on a document preparing screen 260 displayed by the application 102 having a function of preparing a document. A typical sentence input button 264 for inputting a typical sentence and a typical sentence registering button 266 for registering the typical sentence are arranged on the on-screen keyboard 262. The registering section 114 does not accept the registration of a typical sentence when no character string is input. Thus, the typical sentence registering button 266 is grayed out.

Figure 19:
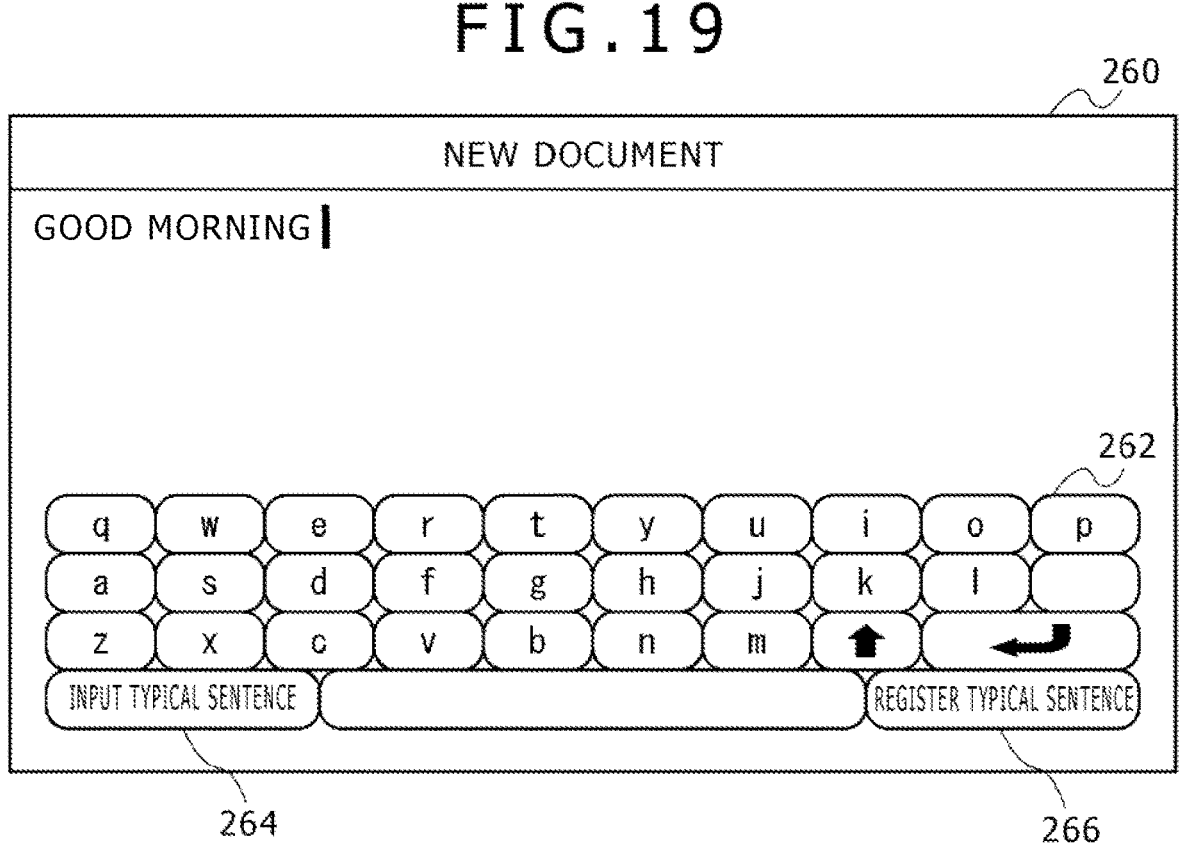
FIG. 19 is a diagram showing an example of a screen displayed on the display device.

FIG. 19 shows an example of a screen displayed on the display device. After a character string is input on the document preparing screen 260, the input character string can be registered as a typical sentence. The keyboard display section 112 cancels the grayed-out state of the typical sentence registering button 266.

Figure 20:
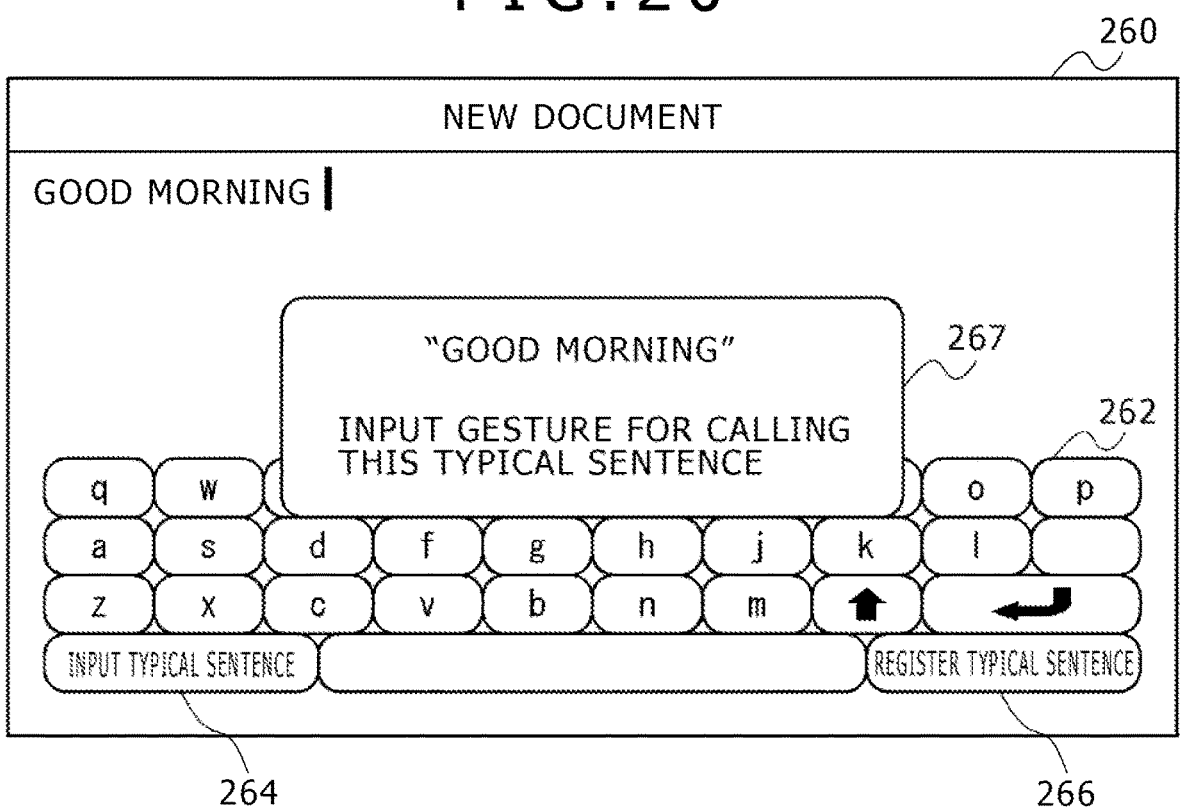
FIG. 20 is a diagram showing an example of a screen displayed on the display device.

FIG. 20 shows an example of a screen displayed on the display device. When the typical sentence registering button 266 is input, the registering section 114 displays a message screen 267 for prompting for the input of a figure (gesture) requested to be drawn to call a typical sentence.

Figure 21:
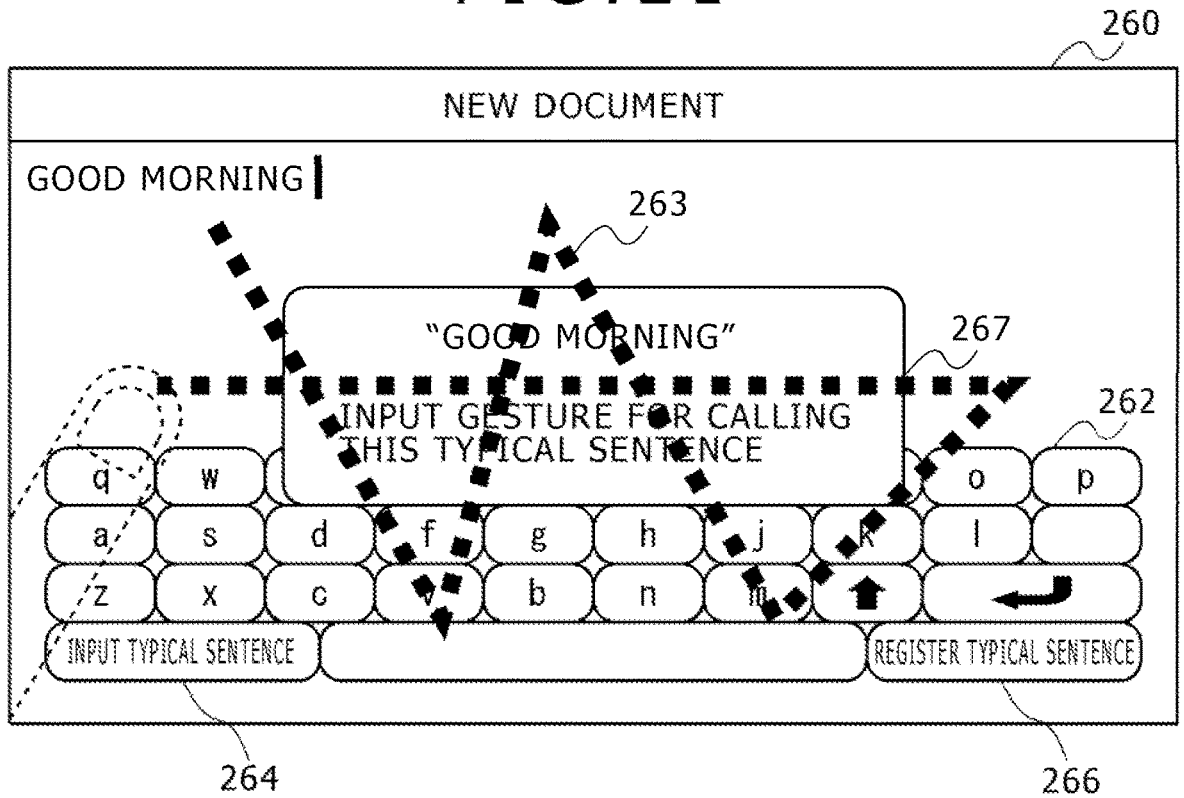
FIG. 21 is a diagram showing an example of a screen displayed on the display device.

FIG. 21 shows an example of a screen displayed on the display device. The registering section 114 obtains the data of a FIG. 263 input to the rear touch pad 32 by the user, and registers the data in the typical sentence database 120 in association with the input character string. The registering section 114 may obtain the data of a figure input on the front touch pad 21. Information as to whether to input a figure to the rear touch pad 32 or to input a figure to the front touch pad 21 may be further registered in the typical sentence database 120, and used at a time of input of a typical sentence.

Figure 22:
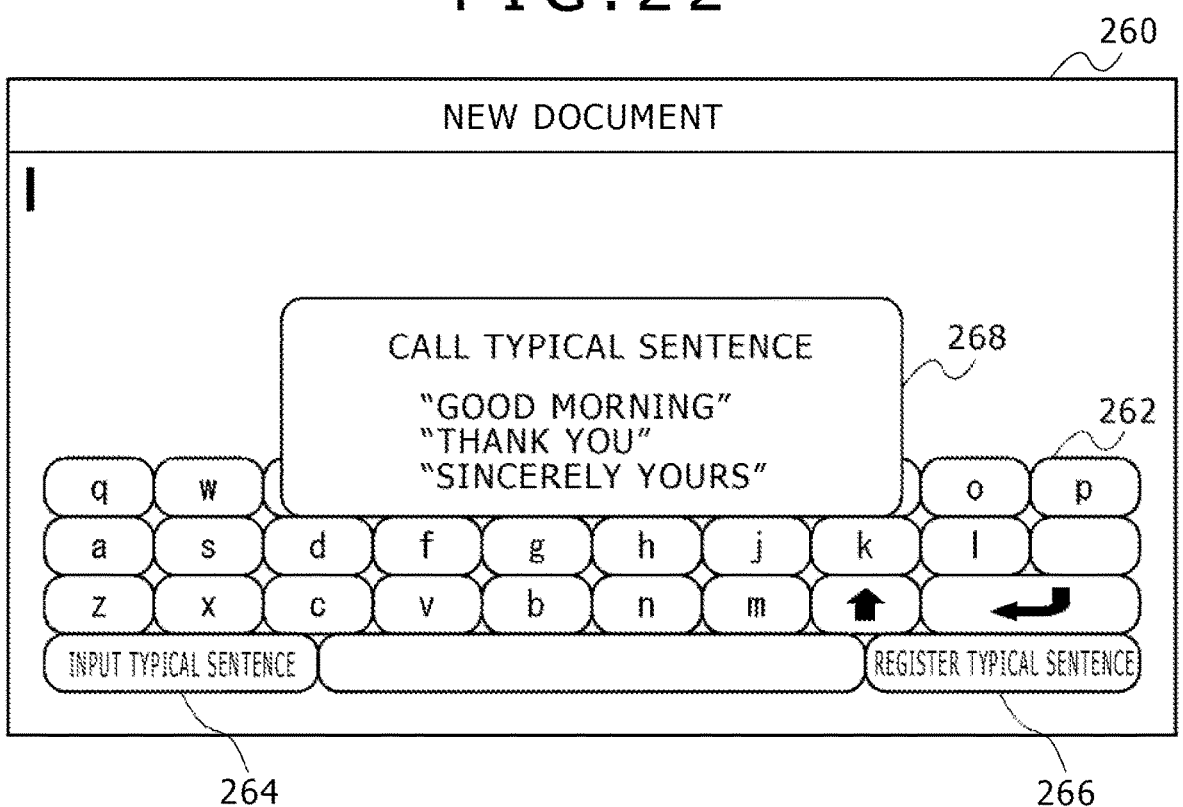
FIG. 22 is a diagram showing an example of a screen displayed on the display device.

FIG. 22 shows an example of a screen displayed on the display device. When the typical sentence input button 264 is input on the document preparing screen 260, the input section 115 refers to the typical sentence database 120, and displays a screen 268 for presenting a list of typical sentences registered in the typical sentence database 120. The input section 115 receives the designation of a typical sentence desired to be input by the user from the list of the typical sentences.

Figure 23:
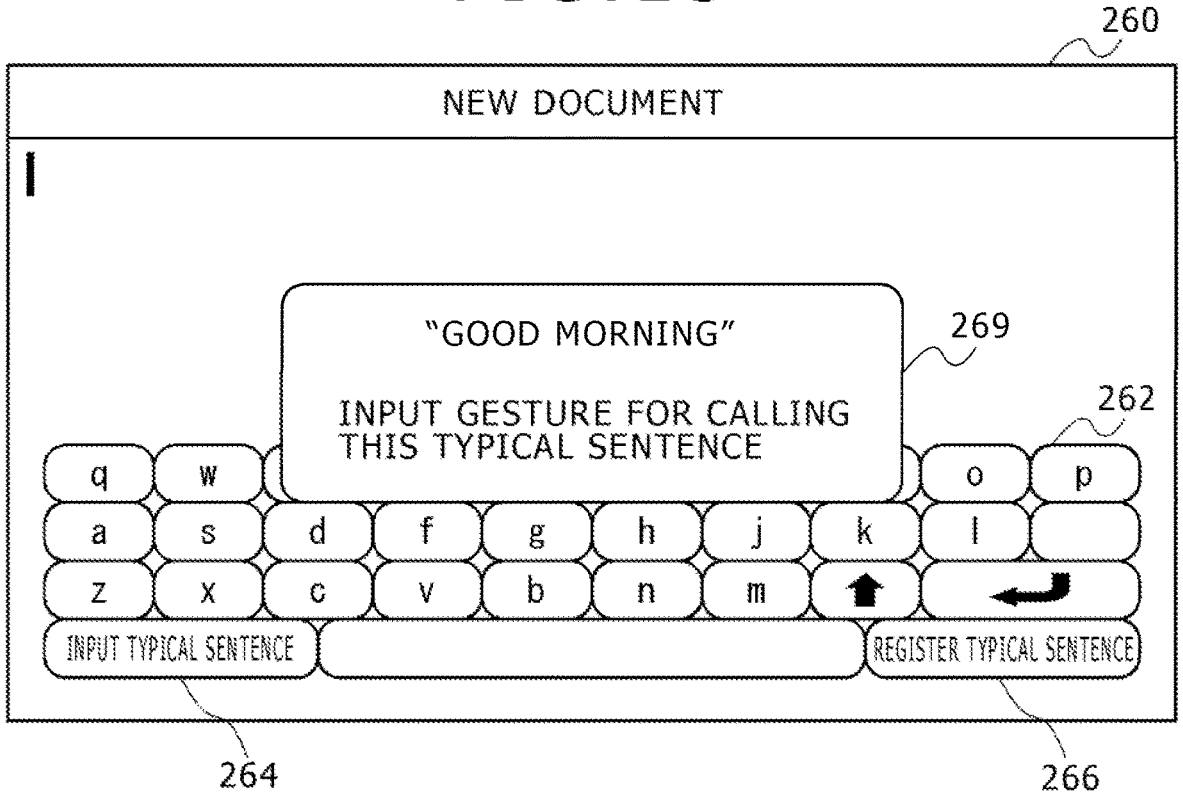
FIG. 23 is a diagram showing an example of a screen displayed on the display device.

FIG. 23 shows an example of a screen displayed on the display device. When the user has selected a sentence desired to be input from the list of the typical sentences, the input section 115 displays a message screen 269 for prompting for the drawing of a figure for calling the typical sentence.

Figure 24:
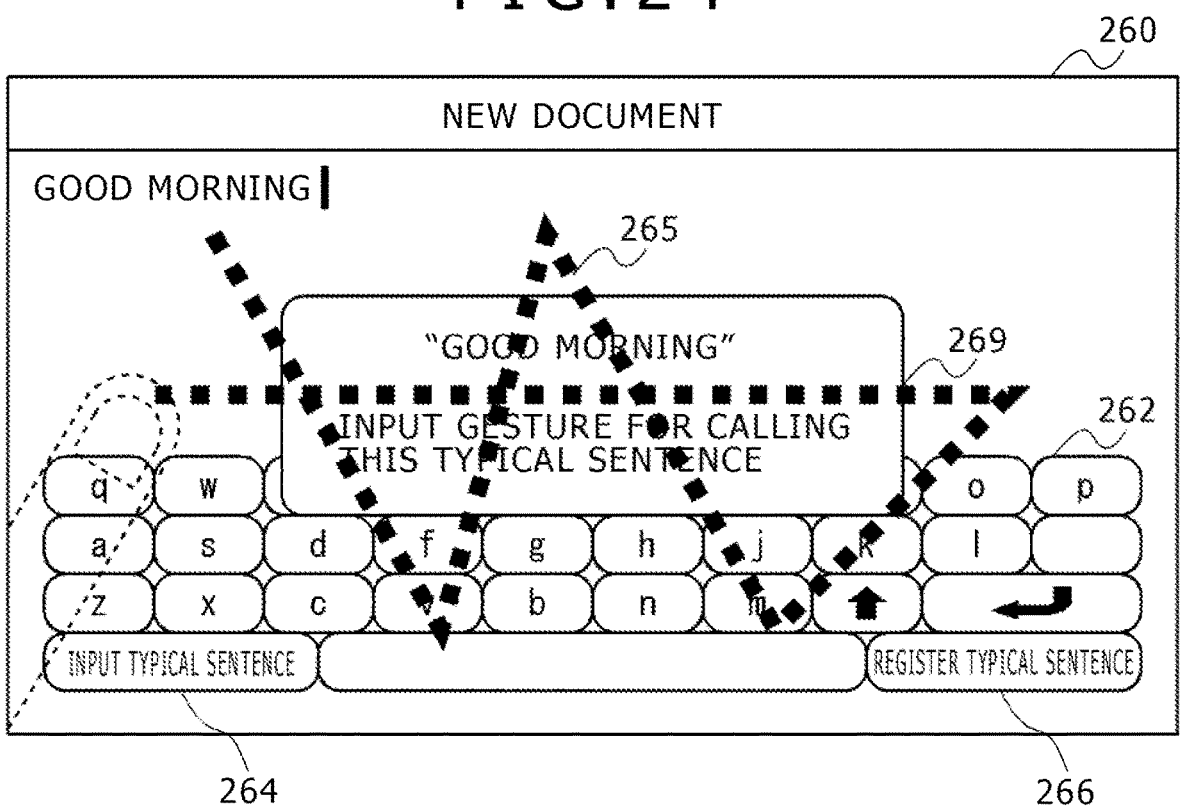
FIG. 24 is a diagram showing an example of a screen displayed on the display device.

FIG. 24 shows an example of a screen displayed on the display device. When the user draws a FIG. 265 for calling the typical sentence on the rear touch pad 32, the search section 116 obtains the data of the FIG. 265, refers to the typical sentence database 120, and makes a search to determine whether or not a figure coinciding with the FIG. 265 is registered in the typical sentence database 120. In the present example, the FIG. 265 coincides with the FIG. 263. Therefore, the input section 115 reads the typical sentence "GOOD MORNING" registered in association with the FIG. 263 from the typical sentence database 120, and inputs the typical sentence.

The input section 115 may display the message screen 269 for prompting for the drawing of a figure as shown in FIG. 23 and receive the drawing of a figure from the user without displaying the screen 268 for presenting the list of the typical sentences as shown in FIG. 22. At this time, when one typical sentence is assigned to one figure, the typical sentence corresponding to the drawn figure may be input without the list of the typical sentences being presented. When a plurality of typical sentences are assigned to one figure, a list of the plurality of typical sentences assigned to the drawn figure may be presented, and a selection by the user may be received. In addition, a typical sentence input function may be called when the drawing of a figure is received. In this case, when the input section 115 receives the drawing of a figure for calling the typical sentence input function from the user, the input section 115 presents the list of the typical sentences registered in the typical sentence database 120, and receives a selection by the user.

According to such a technology, a typical sentence can be input by a simple operation. Thus, the convenience of the user can be improved. Providing such a function in a basic system rather than individual applications enables typical sentence input by a gesture to be performed in various scenes. In addition, because a gesture input to the touch pad provided to the front or the rear is used, a fear of a gesture necessary to input a typical sentence being watched by another person can be reduced.

Assisting in Logon by a Gesture Input

Figure 25:
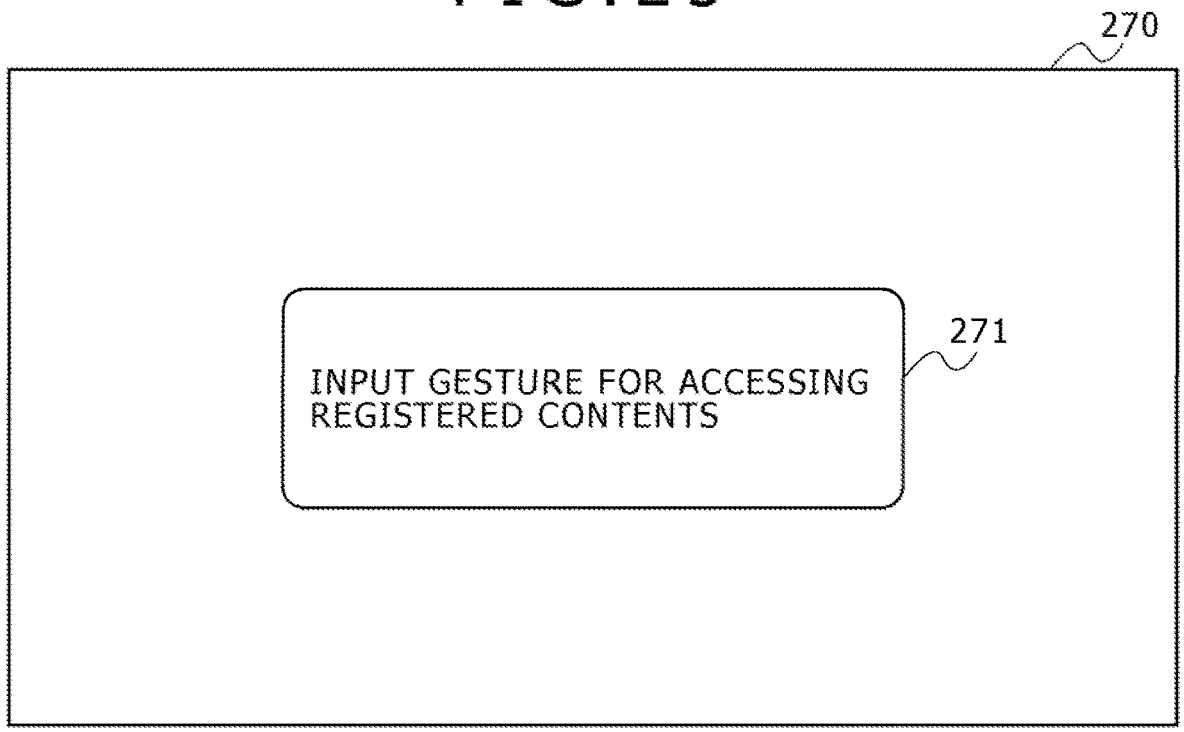
FIG. 25 is a diagram showing an example of a screen displayed on the display device.

FIG. 25 shows an example of a screen displayed on the display device. When the user requests access to contents that require authentication, the input section 115 refers to the authentication information database 122, and displays, on a screen 270, a message screen 271 for prompting for input of a figure (gesture) requested to be drawn to call access information for accessing the contents which access information is registered in the authentication information database 122.

Figure 26:
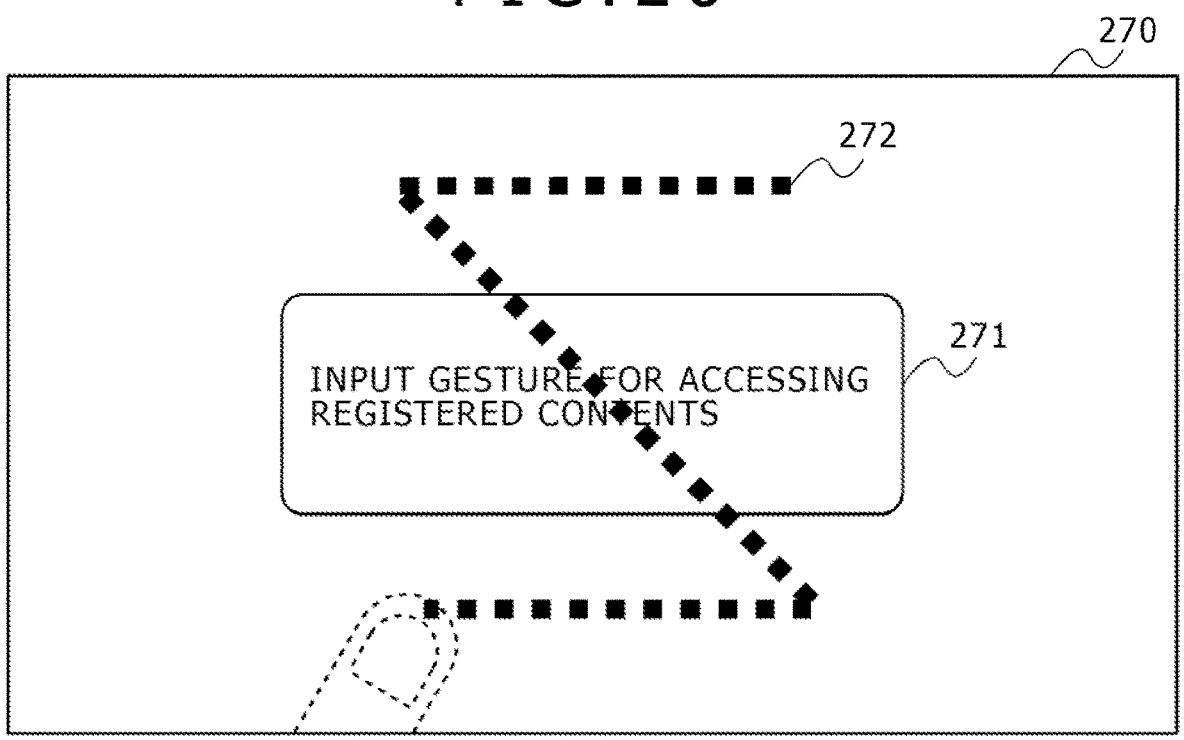
FIG. 26 is a diagram showing an example of a screen displayed on the display device.

FIG. 26 shows an example of a screen displayed on the display device. When the user draws a FIG. 272 for calling the access information on the front touch pad 21, the search section 116 obtains the data of the FIG. 272, refers to the authentication information database 122, and makes a search to determine whether or not a figure coinciding with the FIG. 272 is registered in the authentication information database 122. When the figure coinciding with the FIG. 272 is retrieved, the input section 115 reads the access information stored in association with the FIG. 272 from the authentication information database 122, and inputs the access information to the application 102 having functions of a web browser. The application 102 having the functions of a web browser accesses the contents using the access information input by the input section 115, for example, a URL.

Figure 27:
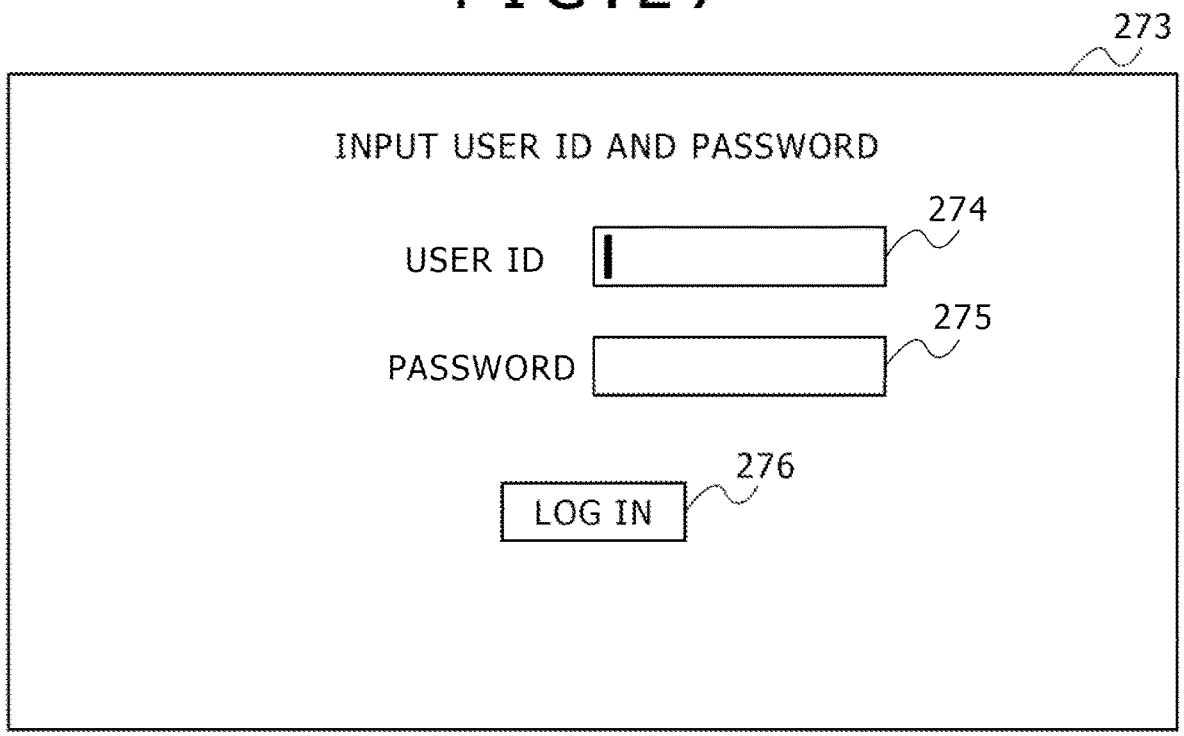
FIG. 27 is a diagram showing an example of a screen displayed on the display device.

FIG. 27 shows an example of a screen displayed on the display device. The application 102 having the functions of a web browser displays a login screen 273. The login screen 273 is provided with a region 274 for inputting a user ID and a region 275 for inputting a password. When the user inputs these pieces of authentication information and clicks a login button 276, authentication is performed to allow access to the contents.

Figure 28:
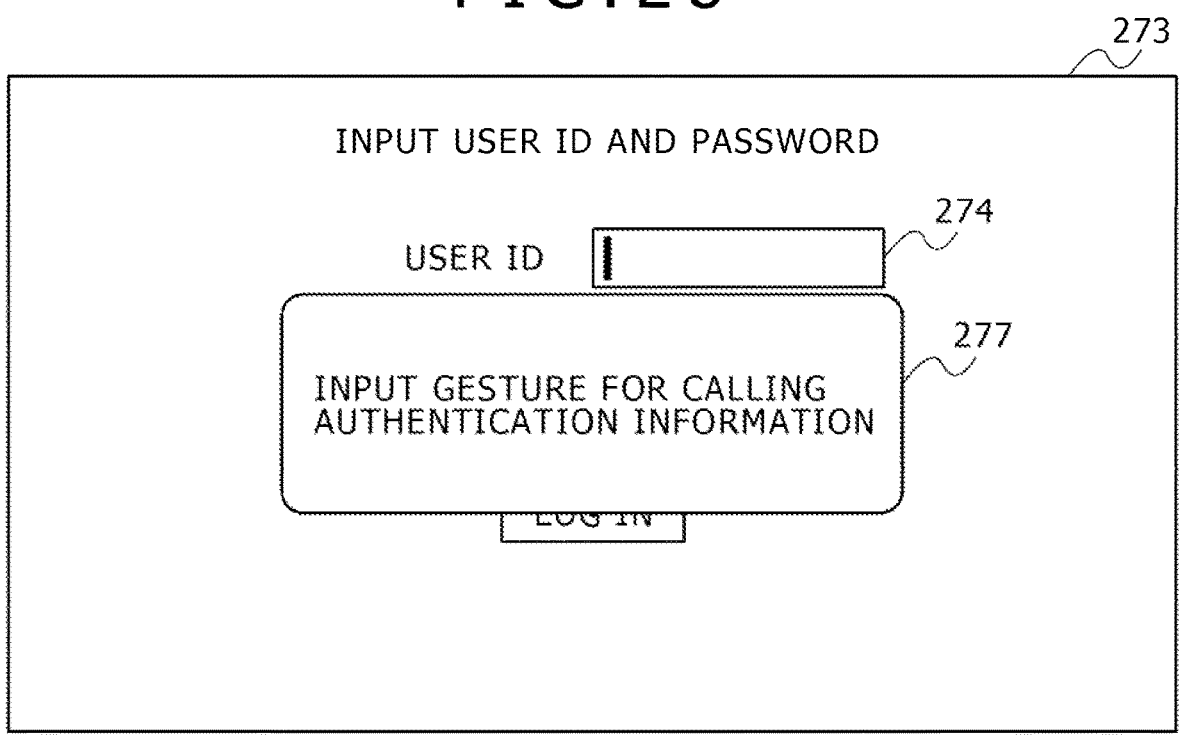
FIG. 28 is a diagram showing an example of a screen displayed on the display device.

FIG. 28 shows an example of a screen displayed on the display device. The input section 115 displays a message screen 277 for prompting for the input of a figure requested to be drawn to call the authentication information on the login screen 273.

Figure 29:
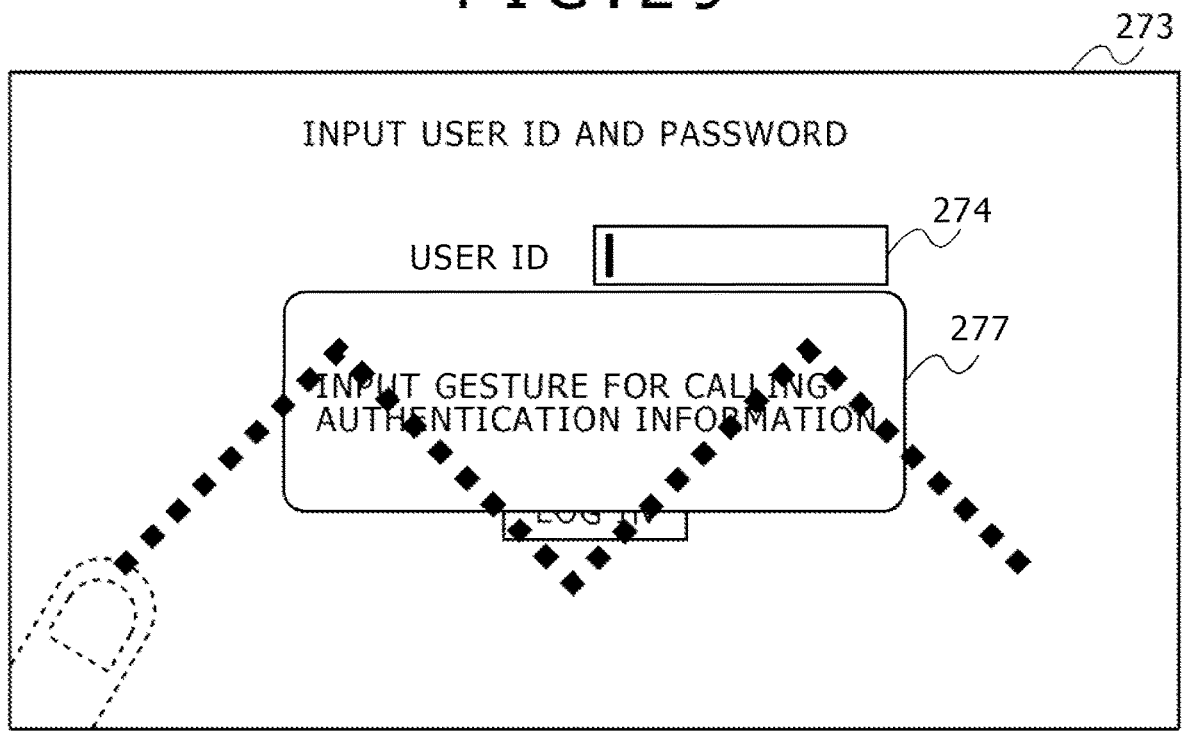
FIG. 29 is a diagram showing an example of a screen displayed on the display device.

FIG. 29 shows an example of a screen displayed on the display device. When the user draws a FIG. 278 for calling the authentication information on the rear touch pad 32, the search section 116 obtains the data of the FIG. 278, refers to the authentication information database 122, and makes a search to determine whether or not a figure coinciding with the FIG. 278 is registered in the authentication information database 122. When the figure coinciding with the FIG. 278 is retrieved, the input section 115 reads the authentication information stored in association with the FIG. 278 from the authentication information database 122, and inputs the authentication information to the application 102 having the functions of a web browser. The application 102 transmits the input authentication information to a server, and requests authentication. When the authentication has succeeded, the contents can be accessed.

According to such a technology, both of access information for accessing contents that require authentication and authentication information such as a password or the like can be input by a gesture. Thus, the contents can be accessed by simple operation, so that the convenience of the user can be improved, and also the confidentiality of the access information and the authentication information can be improved. In addition, because a gesture input is received using the rear touch pad 32, a fear of the gesture to be input being watched by another person can be reduced, and thus security can be improved. In addition, the information for the contents that require authentication can be managed collectively.

The above description has been made of an example in which authentication information is input when contents are accessed by a web browser. However, a similar technology can be applied to other authentications. For example, gesture input can be used also in a case where the use of the game device 10 is locked temporarily and authentication information is requested to release the lock. In this case, a gesture for calling a lock releasing screen, the lock releasing screen, and a lock releasing gesture are stored in the authentication information database 122 in advance in association with each other. First, the input section 115 receives the gesture for calling the lock releasing screen from the user, and presents the lock releasing screen associated with the gesture. Next, a lock releasing gesture is further received from the user on the lock releasing screen, and the lock is released when the lock releasing gesture coincides with the gesture registered in the authentication information database 122.

When the input section 115 receives a gesture not registered in the authentication information database 122, the input section 115 may present a lock releasing screen corresponding to the unregistered gesture. This enables the lock to be released without a lock releasing method being watched by another person even under a public environment. In addition, a degree of difficulty of release can be improved by combining two or more gestures with each other.

Not only the data on the shape of figures but also data on the order of strokes, pressure, speed, thickness, and the like may be registered as the data of figures registered in the typical sentence database 120 or the authentication information database 122. For example, time series data obtained by recording input positions and pressures at predetermined intervals may be registered. Thus, whether or not an input figure coincides with a registered figure can be determined also in consideration of the order of strokes, pressure, speed, thickness, and the like at a time of input. Therefore, even if another person watches a figure being input, a typical sentence, authentication information, or the like can be prevented from being called by merely inputting the same figure. This can further improve security.

The authentication information database 122 may further store information necessary to input authentication information. For example, information indicating whether the authentication information input screen is described in HTML or described in Java (registered trademark), information indicating whether or not an input region is active at a time of access, information indicating whether or not a caret is in the input region at the time of access, a method for moving the caret between a plurality of input regions, and the like may be registered in the authentication information database 122, and used for the input section 115 to input the authentication information automatically.

The input section 115 may receive a figure drawn on the front touch pad 21, receive a figure drawn on the rear touch pad 32, or receive a combination of the figure drawn on the front touch pad 21 and the figure drawn on the rear touch pad 32. When the input section 115 receives the input of a figure from both of the front touch pad 21 and the rear touch pad 32, the input section 115 may sequentially receive the drawing of figures, for example, by receiving a figure drawn on the front touch pad 21 and, when authentication for the figure drawn on the front touch pad 21 has succeeded, then receiving a figure drawn on the rear touch pad 32, or may receive a combination of a figure drawn on the front touch pad 21 and a figure drawn on the rear touch pad 32 and then make authentication performed, or may request inputs that temporally overlap each other, such for example as the drawing of a figure also on the rear touch pad 32 during the drawing of a figure on the front touch pad 21.

Function Control Using a Back Touch During a Temporary Stop

When the orientation of the game device 10 is changed such that the display device 20 faces downward vertically during operation of the game device 10, the stopped state control section 117 makes the application 102 in operation make a transition to a stopped state automatically. It may be determined that the game device 10 is faced downward on the basis of information obtained from the motion sensor 67 or the geomagnetic sensor 68 or by use of an image imaged by the front camera 30. When a predetermined time has passed with the stopped state maintained, the stopped state control section 117 makes the game device 10 make a transition to a sleep mode automatically. Whether or not to make the game device 10 make a transition to the stopped state or the sleep mode when the game device 10 is faced downward may be allowed to be set.

When receiving an input to the rear touch pad 32 while the game device 10 is set in the stopped state or the sleep mode by the stopped state control section 117, the function control section 118 refers to the function table 124, and calls a function corresponding to the input to the rear touch pad 32. The function table 124 stores regions of the rear touch pad 32 and functions to be called in association with each other. The function control section 118 calls a function associated with a region in which the input to the rear touch pad 32 is received. The function control section 118 may call, for example, a function of making a telephone call, a function of setting an alarm, a function of reproducing music, a function of receiving and outputting a broadcast, and the like. The function control section 118 may allow the rear touch pad 32 to be used as a remote control for another device while the game device 10 is faced downward.

Screen Control Using a Back Touch

Figure 30:
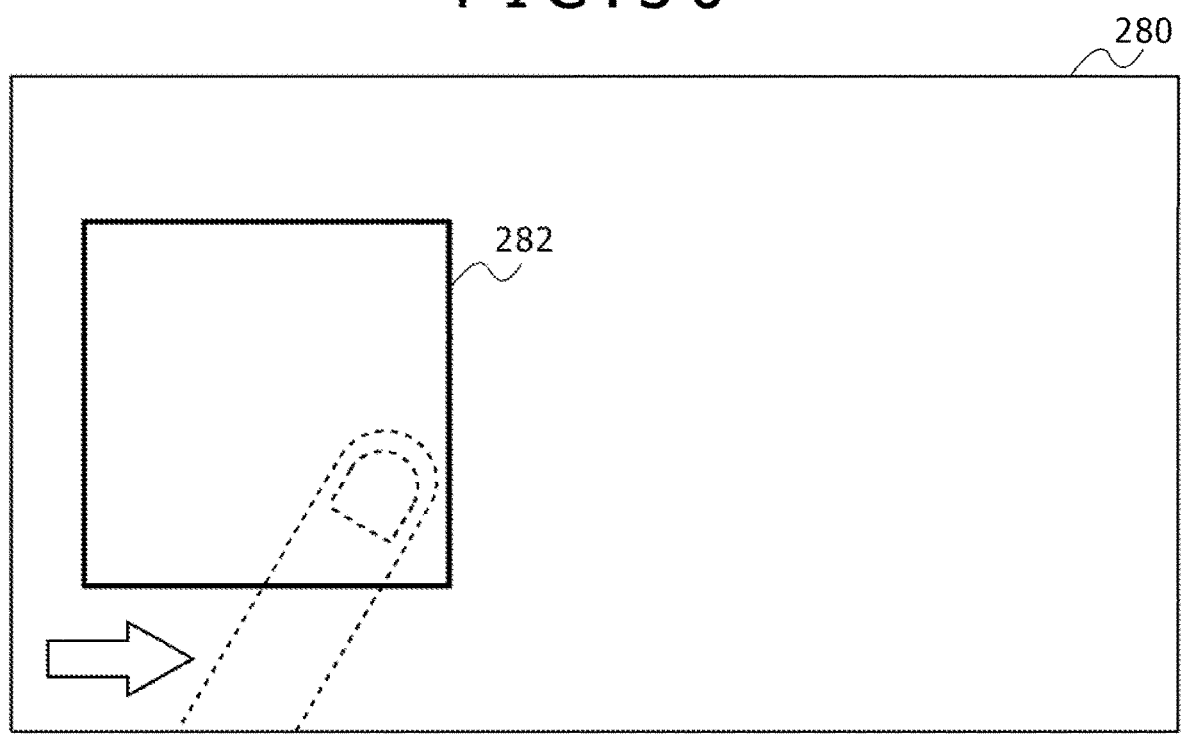
FIG. 30 is a diagram showing an example of a screen displayed on the display device.

FIG. 30 shows an example of a screen displayed on the display device. When the screen control section 119 receives a drag input or a flick input on the rear touch pad 32 while the application 102 displays a screen 280, the screen control section 119 draws out a sub-screen 282 from an edge of the screen 280 according to the direction of the input, and displays the sub-screen 282. For example, when the screen control section 119 receives an input from a left edge of the rear touch pad 32 to a center of the rear touch pad 32, the screen control section 119 draws out the sub-screen 282 in a right direction from the left edge of the screen 280, and displays the sub-screen 282. The screen control section 119 may obtain an amount of movement of the drag input or the flick input, and determine a degree to which the sub-screen 282 is to be drawn out according to the amount of movement. The screen control section 119 may determine the type or contents of the drawn-out sub-screen according to the number of fingers of the drag input or the flick input. The screen control section 119 may move the sub-screen 282 according to another input to the rear touch pad 32. When the screen control section 119 receives a drag input or a flick input on the rear touch pad 32 in an opposite direction from the direction in which the sub-screen 282 has been drawn out, the screen control section 119 may retract the drawn-out sub-screen 282 in the direction of the edge of the screen 280.

According to such a technology, the sub-screen can be displayed by an intuitive and simple operation, so that the convenience of the user can be improved. In addition, the operation of drawing out the sub-screen can be performed without the screen of the application being hidden by fingers while the game device 10 is held by both hands.

The present invention has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present invention.

REFERENCE SIGNS LIST

10 Game device, 20 Display device, 21 Front touch pad, 32 Rear touch pad, 70 Operating section, 102 Application, 110 Input control block, 111 Input receiving section, 112 Keyboard display section, 113 Cursor control section, 114 Registering section, 115 Input section, 116 Search section, 117 Stopped state control section, 118 Function control section, 119 Screen control section, 120 Typical sentence database, 122 Authentication information database, 124 Function table.

INDUSTRIAL APPLICABILITY

The present invention is applicable to input devices that control inputs in portable terminals.

The invention claimed is:

1. A non-transitory computer readable medium having stored thereon an input control program for a computer having a front touch screen and a rear touch pad, the input control program comprising:
    a function of displaying a plurality of input regions corresponding to a plurality of input objects on the front touch screen;
    a function of receiving a first operation input on the rear touch pad, and displaying, in an enlarged state on the front touch screen, a predetermined input region including a first subset of input objects from the plurality of input objects; and
    a function of receiving a second operation input on the front touch screen while the first operation input on the rear touch pad is maintained, and inputting an input object corresponding to an input region identified by the second operation input;
    the function of receiving the second operation input further disabling any input on the front touch screen received outside the input region displayed in the enlarged state and an adjacent input region on a periphery of the input region displayed in the enlarged state while the first operation input on the rear touch pad is maintained,
    wherein the adjacent input region includes a second subset of the plurality of input objects different than the first subset, and
    in response to receiving the second operation input function, a function of changing an arrangement of the second subset of the plurality of input objects so that a distance, in both a vertical direction and a horizontal direction, between the second subset of the plurality of input objects is increased without enlarging a size of the second subset of the plurality of input objects.

2. The non-transitory computer readable medium according to claim 1,
    wherein the front touch screen displays, in the enlarged state, an input region corresponding to an input position of the first operation input on the rear touch pad.

3. The non-transitory computer readable medium according to claim 1,
    wherein the function of changing changes the arrangement of the second subset of the plurality of input objects increases the distance between the second subset of the plurality of input objects in accordance with an input time of the first operation input.

4. The non-transitory computer readable medium according to claim 1,
    wherein an enlargement amount of the predetermined input region is proportional to an input time of the first operation input and an input strength of the first operation input.

5. The non-transitory computer readable medium according to claim 1,
    wherein the function of displaying in the enlarged state sets the predetermined input region as a home position in advance, and, at a later point in time, displays the input region set as the home position in the enlarged state when receiving the first operation input.

6. The non-transitory computer readable medium according to claim 1, further comprising:
a function of receiving a third operation input as a movement in position of the first operation input on the rear touch panel while the function of displaying in the enlarged state is displaying the predetermined input region in the enlarged state, and moving the input region displayed in the enlarged state.

7. The non-transitory computer readable medium according to claim 6,
wherein the input control program receives a change in orientation from a sensor provided to the portable terminal,
wherein, while the first operation input is maintained, a tilt of the portable terminal in a first direction causes the input region displayed in the enlarged state to move in the first direction, and
wherein, while the first operation input is maintained, a tilt of the portable operation terminal in a second direction opposite the first direction causes the input region displayed in the enlarged state to move in the second direction.

8. An input device comprising:
a front touch screen
a rear touch pad;
a keyboard display section configured to display a plurality of input regions corresponding to a plurality of input objects on the front touch screen, receive a first operation input on the rear touch pad, and display, in an enlarged state on the front touch screen, a predetermined input region including a first subset of input objects from the plurality of input; and
an input receiving section configured to receive a second operation input on the front touch screen while the first operation input on the rear touch pad is maintained, and input an input object corresponding to an input region identified by the second operation input;
in response to the second operation input, disabling any input on the front touch screen received outside the input region displayed in the enlarged state and an adjacent input region on a periphery of the input region displayed in the enlarged state while the first operation input on the rear touch pad is maintained,
wherein the adjacent input region includes a second subset of the plurality of input objects different than the first subset, and
in response to receiving the second operation input function, changing an arrangement of the second subset of the plurality of input objects so that a distance, in both a vertical direction and a horizontal direction, between the second subset of the plurality of input objects is increased without enlarging a size of the second subset of the plurality of input objects.

9. An input control method comprising:
a step of a keyboard display section displaying a plurality of input regions corresponding to a plurality of input objects on a front touch screen;
a step of the keyboard display section receiving a first operation input on a rear touch pad, and displaying, in an enlarged state on the front touch screen, a predetermined input region including a first subset of input objects from the plurality of input objects; and
a step of an input receiving section receiving a second operation input on the front touch screen while the first operation input on the rear touch pad is maintained, and inputting an input object corresponding to an input region identified by the second operation input,
in response receiving the second operation input, disabling any input on the front touch screen received outside of the input region displayed in the enlarged state and an adjacent input region on a periphery of the input region displayed in the enlarged state while the first operation input on the rear touch pad is maintained,
wherein the adjacent input region includes a second subset of the plurality of input objects different than the first subset, and
in response to receiving the second operation input, changing an arrangement of the second subset of the plurality of input objects so that a distance, in both a vertical direction and a horizontal direction, between the second subset of the plurality of input objects is increased without enlarging a size of the second subset of the plurality of input objects.

10. The non-transitory computer readable medium according to claim 1,
wherein the first subset of input objects is displayed at a magnification greater than the second subset of input objects.

* * * * *